US008423644B2

(12) United States Patent
Yamasaki

(10) Patent No.: US 8,423,644 B2
(45) Date of Patent: Apr. 16, 2013

(54) METHOD AND COMPUTER PROGRAM PRODUCT FOR RESOURCE PLANNING

(75) Inventor: Yasushi Yamasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1230 days.

(21) Appl. No.: 10/931,087

(22) Filed: Sep. 1, 2004

(65) Prior Publication Data

US 2006/0069594 A1 Mar. 30, 2006

(30) Foreign Application Priority Data

Jul. 1, 2004 (JP) ................................. 2004-195327

(51) Int. Cl.
*G06F 15/173* (2006.01)

(52) U.S. Cl.
USPC .......................................... 709/226; 709/221

(58) Field of Classification Search .................. 709/221, 709/226
See application file for complete search history.

(56) References Cited

U.S. PATENT DOCUMENTS

| 6,067,545 | A   | * | 5/2000  | Wolff ............................... 707/10      |
| 6,237,144 | B1  | * | 5/2001  | Delo ............................. 717/174      |
| 6,438,591 | B1  | * | 8/2002  | Fehskens et al. ............. 709/223      |
| 6,690,786 | B1  | * | 2/2004  | Kowal et al. ............. 379/221.01      |
| 6,968,324 | B1  | * | 11/2005 | Ruffin et al. .................. 705/400       |
| 2002/0120787 | A1 | * | 8/2002 | Shapiro et al. ................ 709/311       |
| 2003/0093528 | A1 | * | 5/2003 | Rolia ............................. 709/226     |
| 2003/0120778 | A1 | * | 6/2003 | Chaboud et al. .............. 709/225       |
| 2004/0047354 | A1 | * | 3/2004 | Slater et al. .................... 370/400      |

FOREIGN PATENT DOCUMENTS

| JP | 05-012226 | 1/1993 |
| JP | 05-233596 | 9/1993 |
| JP | 11-353358 | 12/1999 |
| JP | 2002-278780 | 9/2002 |
| JP | 2002-323986 | 11/2002 |
| WO | 2004/038588 | 5/2004 |

* cited by examiner

*Primary Examiner* — Thomas Dailey
(74) *Attorney, Agent, or Firm* — Antonelli, Terry, Stout & Kraus, LLP.

(57) ABSTRACT

According to a tendency of a resource allocation request from a customer, a resource configuration that a resource provider provides is changed. The resource allocation request from customer's client machine with respect to a resource that a local domain including a server, a network, and a storage provides is accumulated together with an allocation result, and, on the basis of the accumulated resource allocation information and resource configuration information that the local domain provides, a resource planning algorithm determining the resource configuration to be provided next is executed, and, on the premise that approval of a system manager is obtained via a manager's client machine, the resource configuration change that is a result of the resource planning is applied to a group of resources, and disclosure is made so as to cope with the next resource allocation request by a customer's client machine.

12 Claims, 39 Drawing Sheets

| Resource ID | Status | Attribute Information | Allocation |
|---|---|---|---|
| R1001 | Available | OS=Rinux, Version=1.0, Memory=1GB | Already done |
| R1002 | Available | OS=Rinux, Version=1.0, Memory=1GB | No done yet |
| R1003 | Not available | OS=Rinux, Version=1.0, Memory=1GB | No done yet |
| : | : | : | : |

FIG. 13

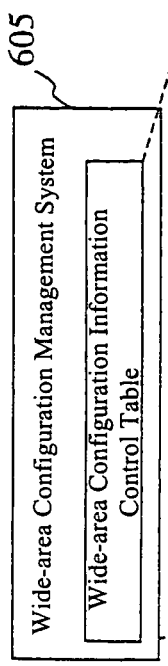

Wide-area Configuration Management System — 605

Wide-area Configuration Information Control Table

904 Wide-area Configuration Information Control Table (Data Center A)

| Resource ID | Attribute information | Number of Units | Domain |
|---|---|---|---|
| GR1001 | OS=Rinux, Version=1.0, Memory=1GB | 30 | Data Center A |
| GR1002 | OS=Rinux, Version=1.0, Memory=2GB | 30 | Data Center A |
| GR1003 | OS=Xindows, Version=1.0, Memory=1GB | 50 | Data Center A |
| GR1004 | OS=Rinux, Version=1.0, Memory=1GB | 40 | Data Center B |
| GR1005 | OS=Rinux, Version=1.0, Memory=2GB | 40 | Data Center B |
| .. | .. | .. | .. |

Resource Planning System Console — 1101

Planning Result History

| Date | Result Action | Attribute value |
|---|---|---|
| 2003/04/13 12:00 | Add Server Machine | OS=Rinux, Version=1.0, Memory=1GB |
| 2003/04/20 12:00 | Add License | Name=Pracle DBMS, Amount=10 |
| 2003/04/27 12:00 | Add License | Name=Pracle DBMS, Amount=10 |
| 2003/05/03 12:00 | Add Memory | Target=M100x, Amount=1GB |

1107

METHOD AND COMPUTER PROGRAM PRODUCT FOR RESOURCE PLANNING

CROSS-REFERENCE TO RELATED APPLICATION

The present application claims priority from Japanese patent application No. JP 2004-195327 filed on Jul. 1, 2004, the content of which is hereby incorporated by reference into this application.

BACKGROUND OF THE INVENTION

The present invention relates to a technique in which a structure for hosting environments to be provided to a client is changed according to needs of the client.

An online system on Internet and a batch processing system of an IT system in a company are configured by a plurality of application programs operated on a plurality of computer resources connected to a network. Some of these application programs are run directly on the computer resources. However, others are interpreted and run on middleware including an interpreter called an "application server".

In this manner, application systems are divided into an application program that is operating and an environment on which an application program operates. Herein, the environment on which the application program operates, that is, a system configured by a computer resource or a program resource such as an application server is called a "hosting environment".

This hosting environment is a network distributing system as mentioned above, and the larger a system in size gets, the higher the costs for system maintenance management become. Accordingly, a configuration and maintenance management of this hosting environment are generally outsourced. This outsourcing is entrusted to a service company called a data center or service provider. As kinds of the hosting environments, there are a web server environment for configuring a company homepage and a mail server function, and the data center determines its services to be provided according to the needs of clients who use the hosting environment.

Further, from the viewpoint of reduction of a Total Cost of Ownership (TCO), attention has been recently attracted to effective use of the computer resource of the IT system in the company. Therefore, also in the IT system of the company, it has been necessary to share therewith the hosting environment on which an application program such as a salary calculation butch processing program is operated. An IT system management department of the company must determine the hosting environment provided as a department so as to be optimized for the IT system in the company.

As mentioned above, the data center or IT system management department in the company has the problem of having to properly determine the configuration of the hosting environment provided. For example, in the data center, it is required to analyze needs of the client with respect to the hosting environment and, on the basis of the analysis result, to introduce a system resource configuring a hosting system effectively with minimum investment. At this time, the introduction must be carried out within a range of the management policy or budget restriction of the company itself.

Similarly, also in the IT system management department of the company, it is required to introduce a system resource so as to meet the hosting environment needs for a group of application programs in the company. At this time, the management policy or budget restriction of the company itself must be taken into consideration. Thus, determination of a resource configuration under a certain kind of restriction conditions is generally called "resource planning".

As the technique for this kind of resource planning, there has been known a technique for acquiring demand-condition information and supply-condition information of the resource at a resource-supply destination and for assisting plans of distribution of the resource (Japanese Patent Laid-open No. 11-353358).

In addition, there has been known another technique for: collecting conditions of using a resource of a business processing program per business; and conducting resource analysis for improvement of the resource distribution and performance improvement per business (Japanese Patent Laid-open No. 2002-278780).

SUMMARY OF THE INVENTION

However, in the above-mentioned conventional techniques, there is the problem that the resource that the service provider providing the hosting environments provides cannot automatically have an optimized configuration with respect to a customer's resource allocation request.

Further, recently, from the viewpoint of reduction of utilization costs and enhancement of reliability, there have been increased demands for wide-area cooperation (wide-area grid) of the system in the data center or company. However, in the case of considering the wide-area cooperation, there is the problem that it is difficult to completely obtain information of resource requirements from clients having the wide-area cooperation. Therefore, it is difficult to optimize the configuration of a resource to be provided next.

Accordingly, the present invention is made in view of the above problems. That is, an object of the present invention is to optimize: a configuration of a system resource to be provided next according to the system resource provided as a hosting environment; and contents of resource allocation request from the client. More particularly, it is to optimize the configuration of system resources according to the needs of the clients even in wide-area cooperation.

In the present invention, a resource configuration is changed based on a resource allocation request received from a client and a current resource configuration, whereby the resource configuration is automatically established according to client' needs.

Therefore, in the present invention, it is possible to automatically establish the resource configuration according to the client's needs and to provide the optimized resource configuration capable of effectively coping with various needs of the client.

Further, even in the case where the client's needs are changed, it is possible to automatically change the resource configuration so that the usability of a system resource can be improved.

BRIEF DESCRIPTION OF THE DRAWINGS

FIG. 13 is an explanatory view for showing a wide-area configuration information control table.

FIG. 23 is an explanatory view for showing an example of a console screen in a resource planning system.

DESCRIPTION OF THE PREFERRED EMBODIMENTS

Hereinafter, an embodiment of the present invention will be detailed based on the accompanying drawings.

Figure 1:
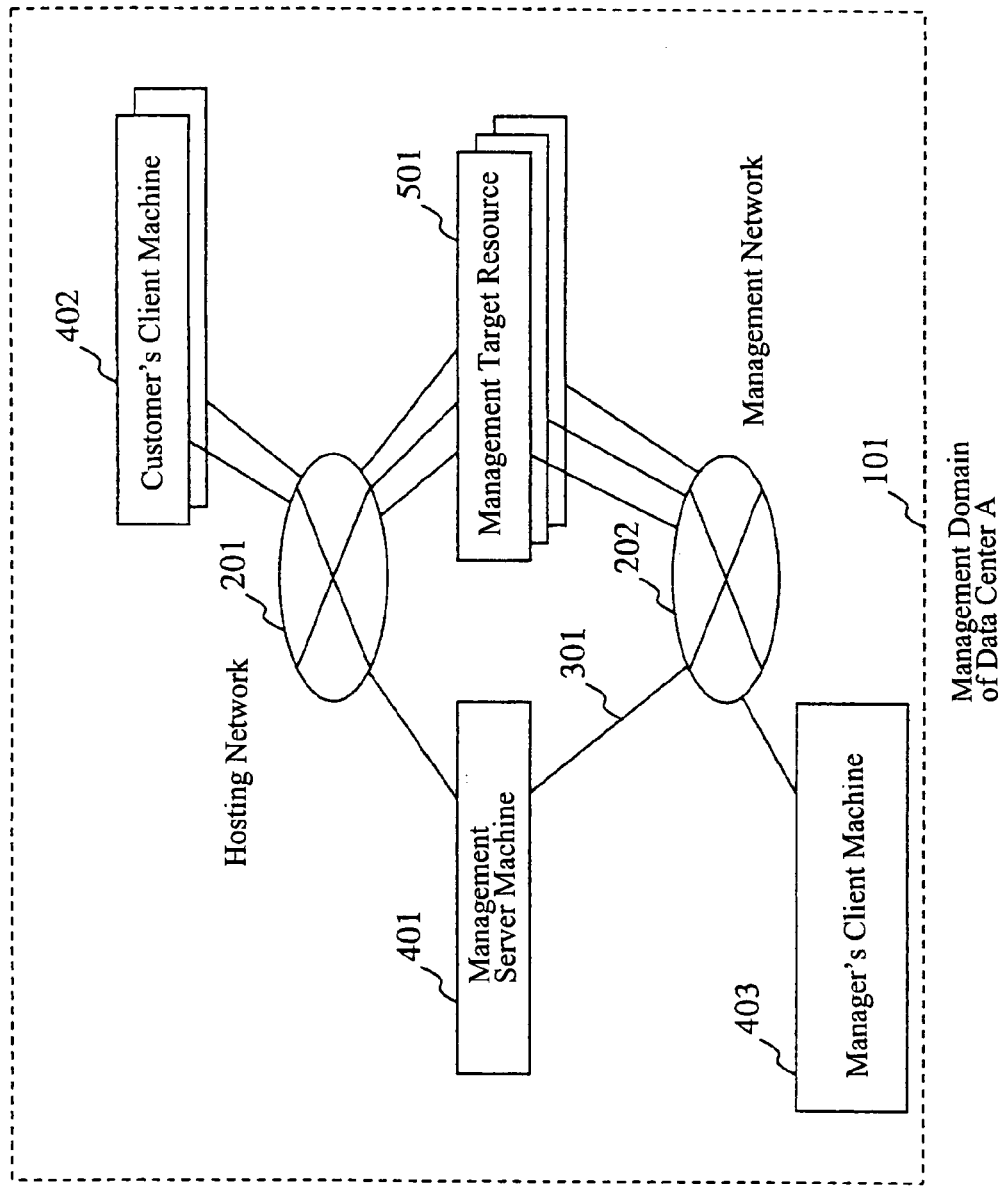
FIG. 1 is a diagram showing the entire structure of a system according to a first embodiment.

FIG. 1 shows the case where the present invention is applied to a data center "A", which provides a plurality of computer resources to clients.

In FIG. 1, the data center A possesses a plurality of management target resources 501 for being provided to customers etc. Each of the management target resources 501 comprises, for example, a server machine, a storage device, and middleware, and a computer resource such as an application software program. However, kinds of resources are not specifically limited thereto.

Further, the data center A includes: a resource allocation request from a client; a management server machine 401 planning a resource that the data center A provides next from the possessed management target resources 501 and which executes a resource planning system; and a manager's client machine 403 that gives commands to the management server machine 401.

These management server machine 401, management target resources 501, and manager's client machine 403 are connected via a management network 202. With regard to the mode of a network connection 301 with the management network 202, various connection means such as wire and wireless may be employed, and are not specifically limited in the present embodiment.

Further, the management server machine 401 and the management target resources 501 are connected also to a hosting network 201 so as for customers or end users of services provided by the customers to be available, and provide the management target resources 501 to user's client machines (client computers) 402. Note that the user's client machines 402 are connected to the hosting network 201 via connection means provided from the outside of the management domain of the data center A.

The management domain (for example, a data center or an IT system in a company) 101 of the data center A shows a range in which a system manager of the data center A has authority to operate each of the server machine and the management target resources 501.

Note that each server machine and each user's client machine 402 are equipped with a CPU, a memory, and a storage device.

Next, the entire program configuration of a resource planning system executed in the management server machine 401 will be explained hereinafter.

Figure 2:
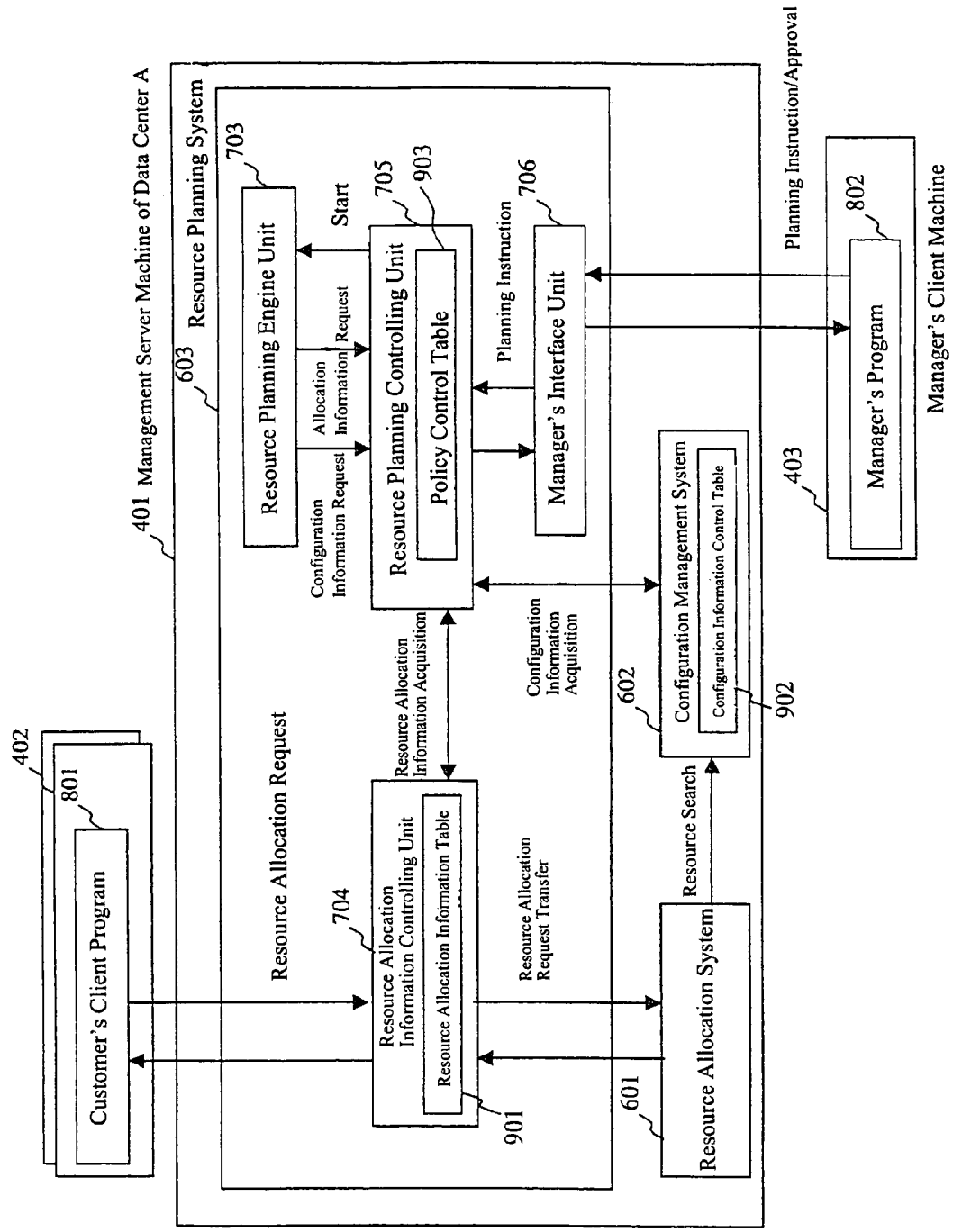
FIG. 2 is a block diagram of a program installed in a management server.

FIG. 2 shows a configuration of a program installed in the management server machine 401, wherein a resource allocation system 601 that allocates the management target resources 501 to the user's client machines 402, a configuration management system 602 that manages the configuration of the management target resources 501, and a resource planning system 603 that determines the management target resources 501 to be allocated on the basis of resource allocation requests from the user's client machines 402 operates on the management server machine 401.

The resource planning system 603 includes: a resource planning engine unit 703 that appropriately adjusts resources to be allocated by a specified algorithm; a resource allocation information controlling unit 704 that controls the allocation conditions of resources; a resource planning controlling unit 705 that controls input/output to the resource planning engine unit 703; and a manager's interface unit 706 that transmits commands from the manager's client machine 403 to the resource planning controlling unit 705.

In the above environment, the flow of a resource allocation process, which premises the resource planning system shown in the present embodiment and is executed by the resource allocation system 601 and the configuration management system 602, will be described below.

First, a user's client program 801 that operates on the user's client machine 402 requests a resource allocation to the resource allocation information controlling unit 704 of the resource planning system 603.

Figure 3:
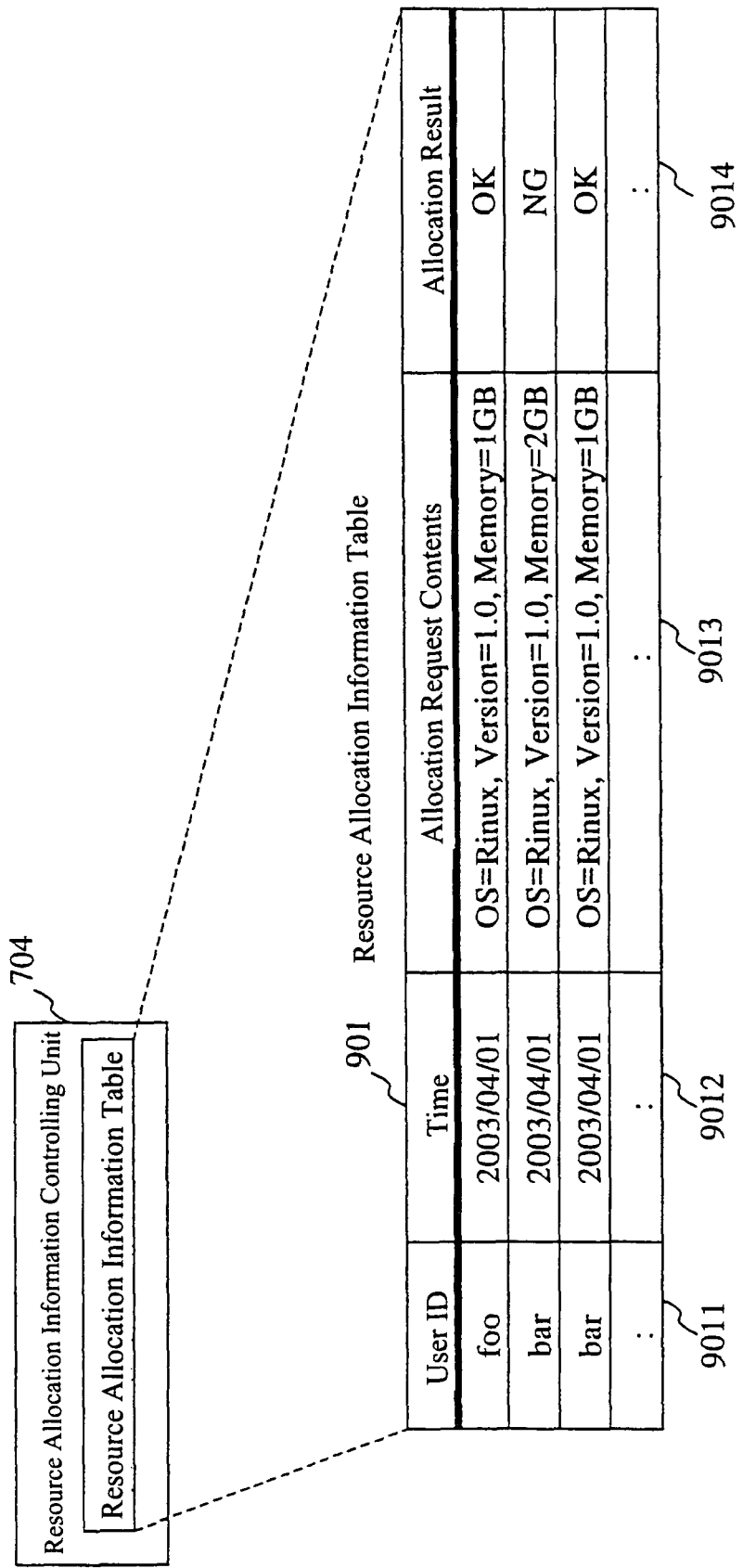
FIG. 3 is an explanatory view for showing an example of a resource allocation information table.

Next, the resource allocation information controlling unit 704 stores the contents of the resource allocation request into a resource allocation information control table 901 shown in FIG. 3, and transfers the resource allocation request to the resource allocation system 601. The resource allocation information control table 901 shown in FIG. 3 has a record in which a user ID 9011 of the customer's client machine 402 to which the resource allocation request has been made and a time 9012 of the allocation request are paired. In the resource allocation information control table 901, the record having with the user ID 9011 and the allocation request time 9012 as a key is constituted by allocation request contents 9013 (for example, OS kind, version, and memory capacity, etc. in the case where the allocation request is a server) and an allocation result 9014 showing the presence or absence of an execution to the request.

Figure 4:
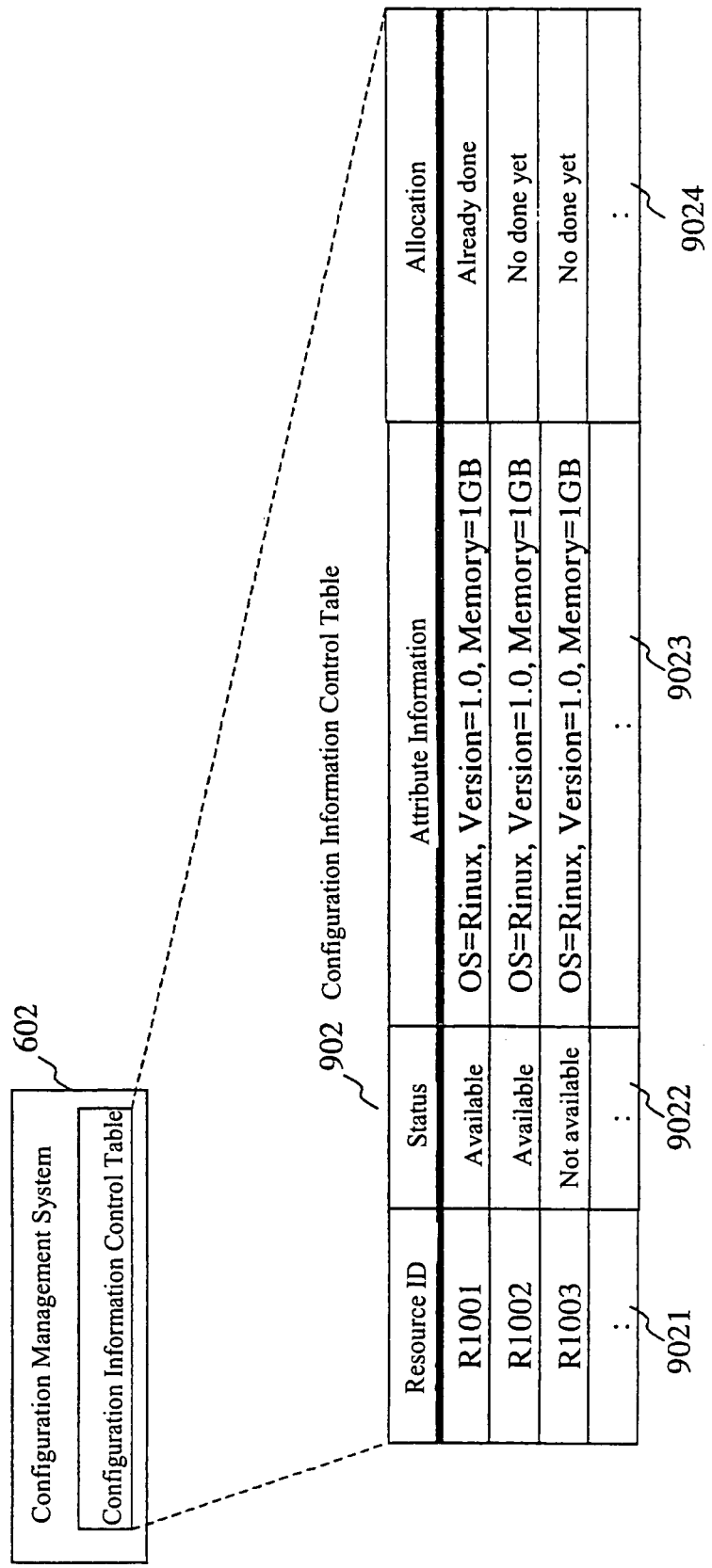
FIG. 4 is an explanatory view for showing an example of a configuration information control table.

The resource allocation system 601, which has received the resource allocation request from the resource allocation information controlling unit 704, carries out a search to the configuration management system 602 on a configuration information control table 902 shown in FIG. 4, on the basis of attribute information included in the resource allocation request information. In the configuration information control table 902 shown in FIG. 4, records are formed per resource ID 9021 that is an identifier of the management target resource 501. Each record includes: a status 9022 showing whether its operation is possible or impossible; attribute information 9023 showing resource kinds etc. (for example, OS kind, version, and memory capacity, etc. in the case where the management target resource 501 is a server machine); and an allocation execution condition 9024.

The configuration management system 602 controls the configuration information control table 902, and, when the attribute information included in the allocation request and the resource corresponding to the above attribute information 9023 are found, notifies configuration information as the search result to the resource allocation system 601 and marks the fact that the above-mentioned resource has been already allocated into the configuration information control table 902.

The resource allocation system 601 transfers the notified configuration information to the resource allocation information controlling unit 704, and the resource allocation information controlling unit 704 stores the allocation result into the resource allocation information control table 901 and then notifies the resource allocation result to the customer's client program 801.

As a result, a history of resource allocation requests/results is left in the resource allocation information control table 901.

Figure 6:
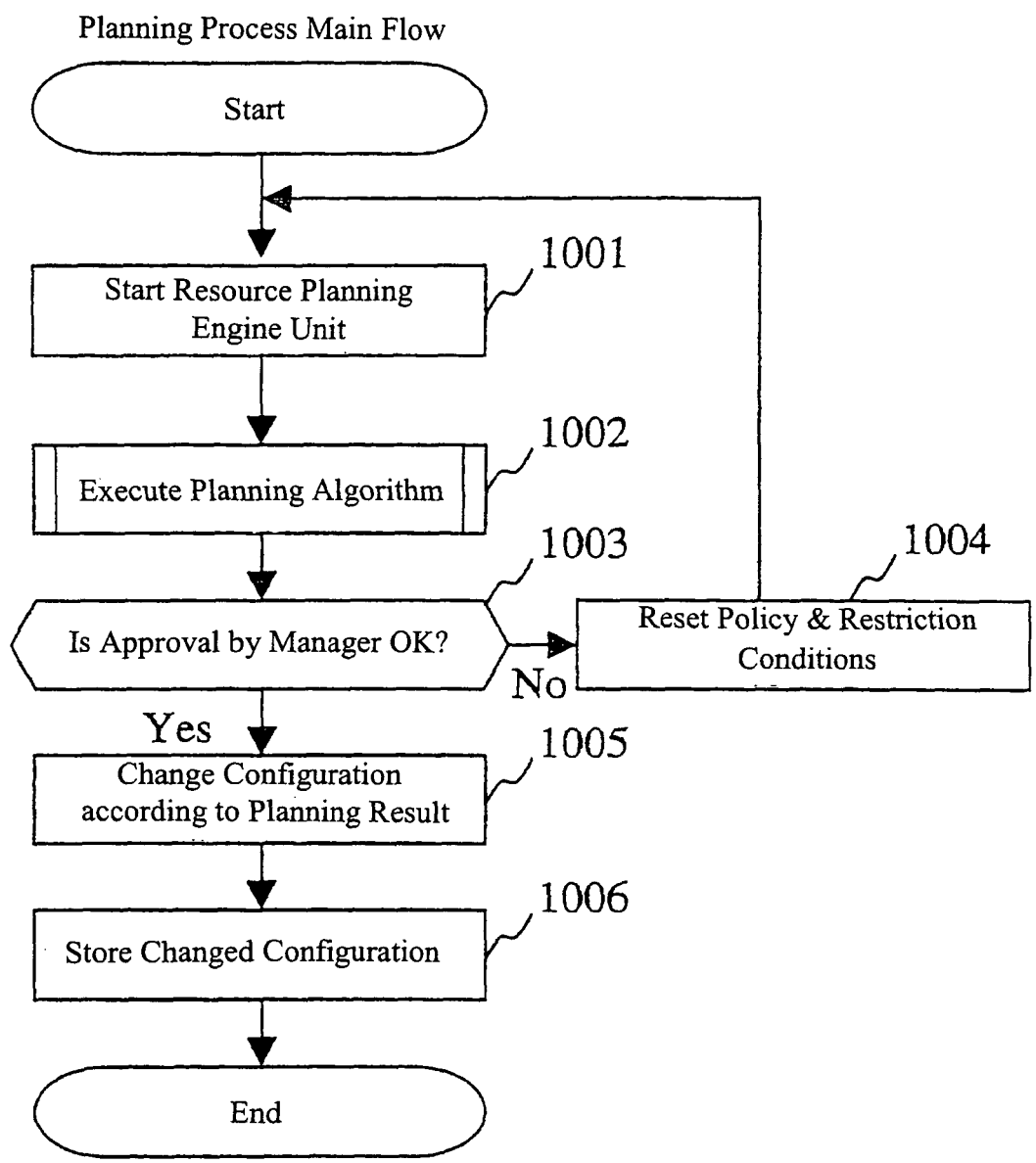
FIG. 6 is a flow chart showing a main routine of a planning process.

Next, FIG. 6 is a main flow chart showing an example of a resource planning process carried out in the resource planning system 603. On the basis of this flow chart, the flow of the resource planning process will be explained below.

Figure 8:
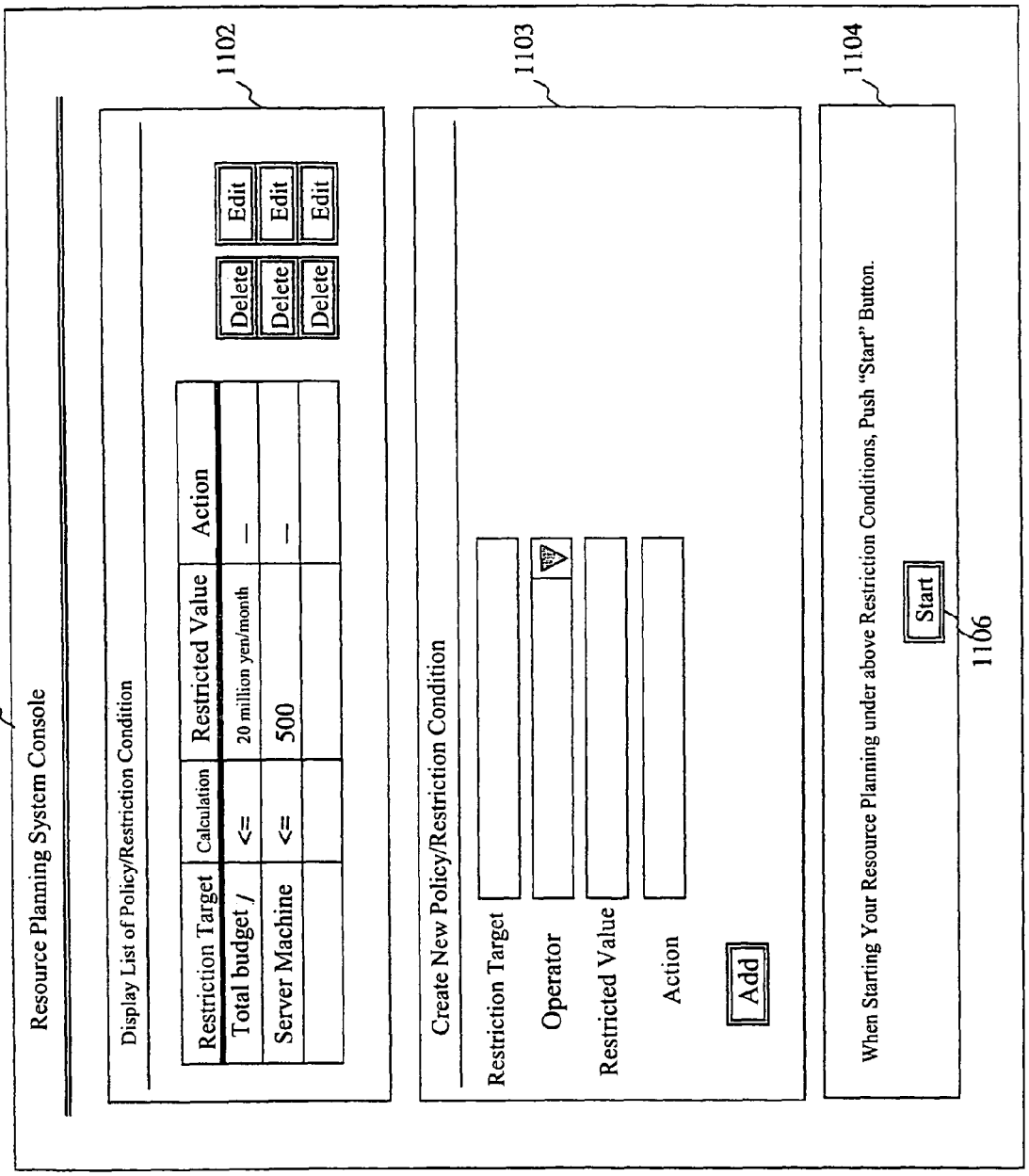
FIG. 8 is an explanatory view for showing an example of a console screen of a resource planning system.

This flow chart is started when a system manager gives an instruction to start the planning process, in a console screen 1101 of the resource planning system shown in FIG. 8 on the manager's client machine 403 (when the system manager pushes a "Start" button 1106 in a start instruction interface 1104). At this time, restriction conditions that the system manager desires is inputted using a restriction condition preparing interface 1103. The inputted restriction conditions are displayed as a list on a restriction condition list displaying interface 1102 (in Figure, total budget, and server machine, etc., money sum as a restriction target, and control target resource 501). Note that the above console screen 1101 is provided by a manager's program 802 executed in the manager's client machine 403 and all of these operations by using the system manager's interface are transferred via the manager's interface unit 706 (see FIG. 2) to the resource planning controlling unit 705 and then are processed therein.

When the resource planning is started by the system manager, the resource planning controlling unit 705 starts the resource planning engine unit 703 (step 1001). At this time, the resource planning controlling unit 705 transfers the restriction condition information set by the system manager to the resource planning engine unit 703.

The started resource planning engine unit 703 executes its original planning algorithm (step 1002). To the resource planning engine unit 703 that executes the specific algorithm, the resource planning controlling unit 705 provides general-purpose functions, and are equipped with functions required in common with respect to any resource planning algorithm, i.e., a resource allocation information acquisition function and a configuration information acquisition function.

Figure 7:
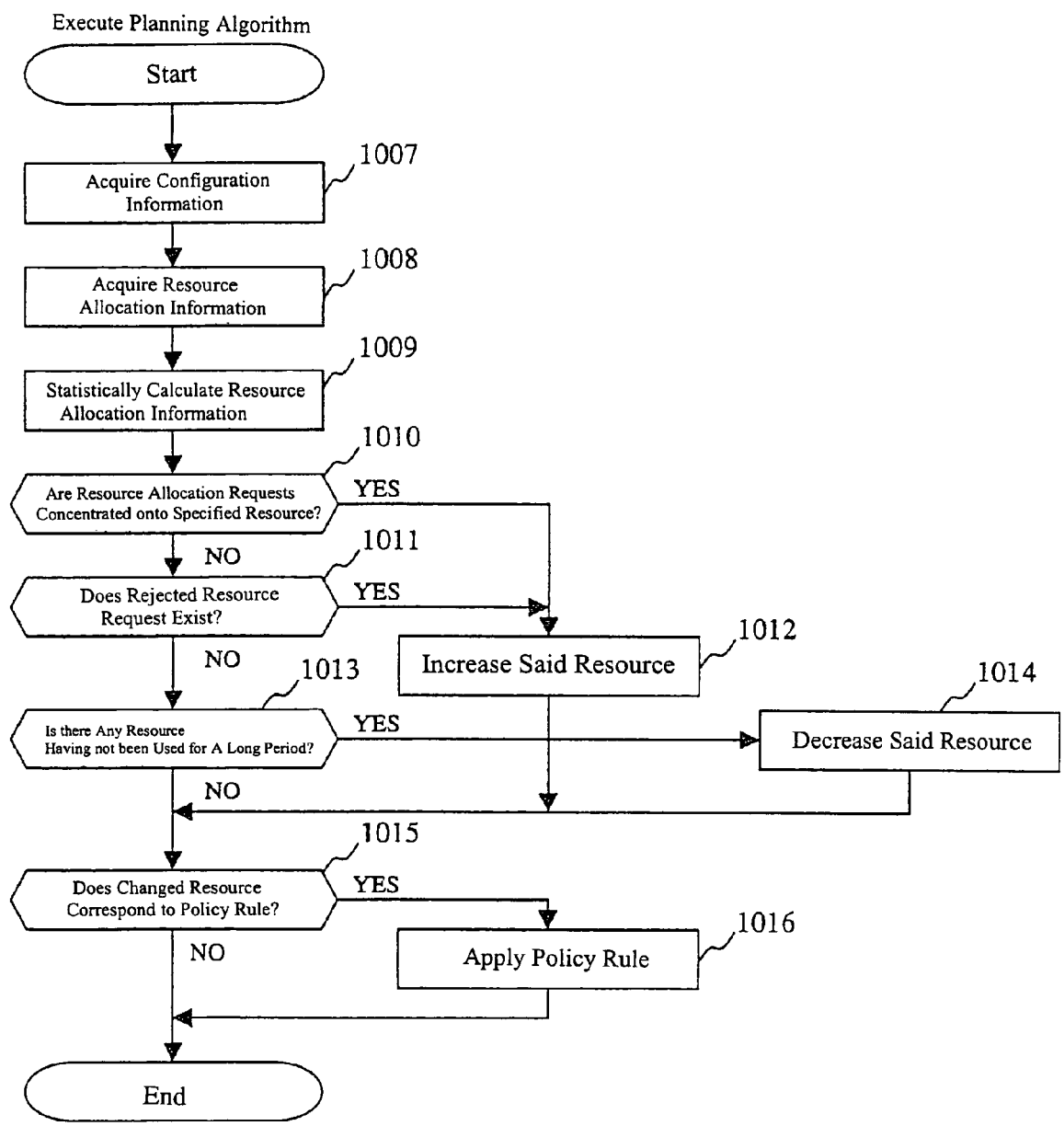
FIG. 7 is a flow chart showing an example of a planning algorithm executed in a resource planning engine unit.

FIG. 7 shows an example of the above-mentioned planning algorithm, and this algorithm is one to appropriately increase and decrease provision resources (management target resources 501) on the basis of the history of past resource allocation. Herein, based on the flow chart in FIG. 7, concrete processing contents will be explained.

First, the started resource planning engine unit 703 outputs a configuration information acquisition request to the resource planning controlling unit 705. The resource planning controlling unit 705 acquires the contents of the configuration information control table 902 from the configuration management system 602 and sends them back to the resource planning engine unit 703 (step 1007).

Next, the resource planning engine unit 703 similarly outputs a resource allocation information acquisition request to the resource planning controlling unit 705. The resource planning controlling unit 705 acquires the contents of the resource allocation information table 901 from the resource allocation information controlling unit 704 and sends them back to the resource planning engine unit 703 (step 1008).

The resource planning engine unit 703, having acquired these information items, carries out statistic calculations of the resource allocation information (step 1009). On the basis of the result of the above-mentioned statistic calculations, the resource planning engine unit judges: whether resource allocation requests are concentrated onto a specified resource (step 1010); whether there has been a resource allocation request whose allocation was unavailable for the absence of the resource to be provided although there is the resource allocation request (step 1011); and increasing of the above-mentioned resource (the requested resource) when either of the conditions is satisfied (step 1012).

Further, the resource planning engine unit judges: whether there is a resource to which a resource allocation request has not been made for a long period (a preset period, for example, several days etc.) (step 1013); and decreasing of the above-mentioned resource when there has been the resource allocation request (step 1014).

Figure 5:
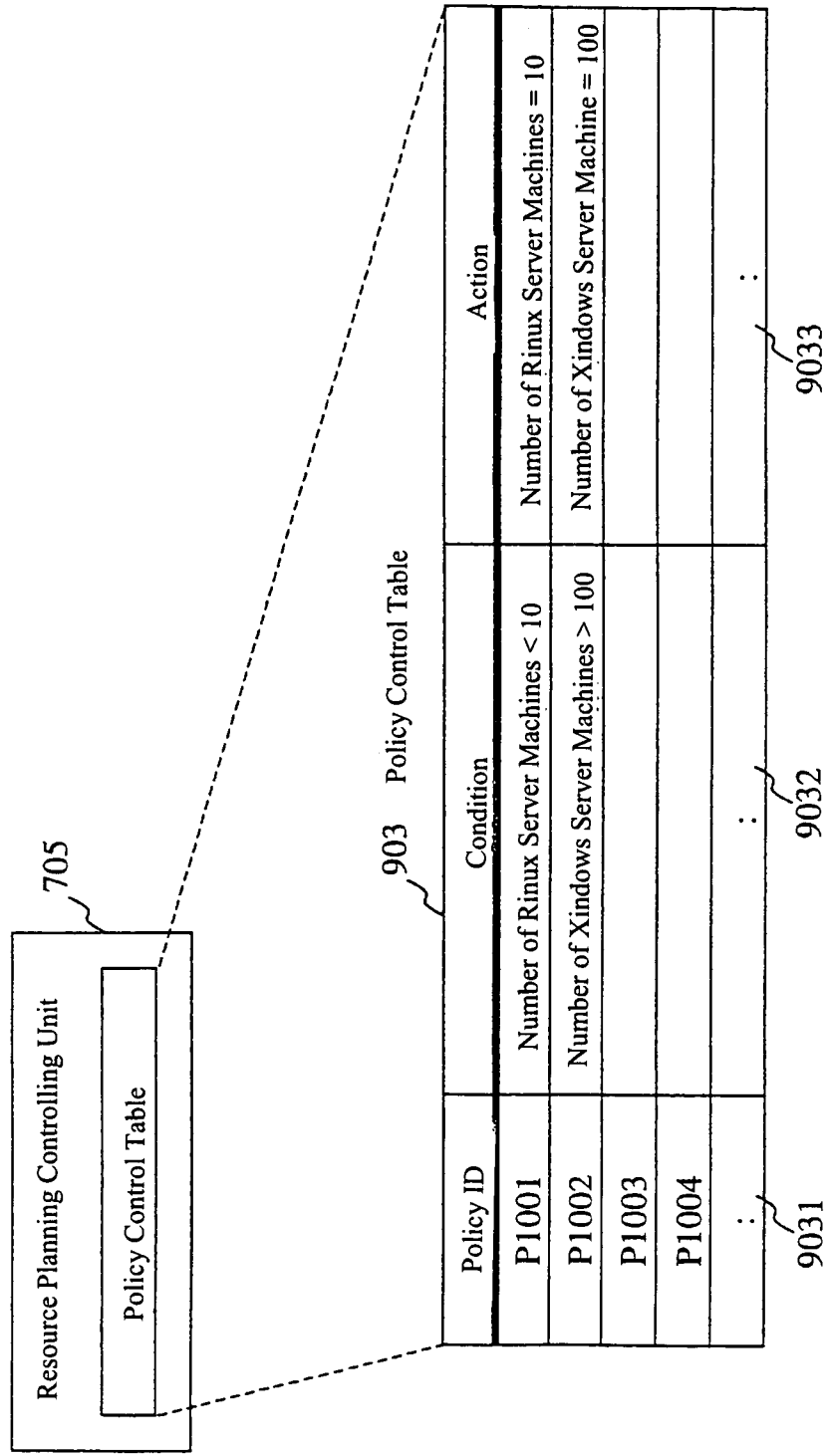
FIG. 5 is an explanatory view for showing an example of a policy control table.

Finally, it is judged whether the resource configuration changed according to the above results satisfies policy rules of the system manager (step 1015), and if the policy rules are satisfied, actions to the policy rules are carried out (step 1016). The policy rules are defined in a policy control table 903 of the resource planning controlling unit 705, as shown in FIG. 5. In this policy control table 903, a policy ID 9031 to become an identifier of policy, and a policy condition 9032 and an action 9033 corresponding to this policy ID 9031 are interrelated.

In this example, in the policy ID "1001", with respect to the condition 9032 that the total number of Rinux server machines becomes less than 10 units, the action 9033 that the total number of Rinux server machines is set at 10 units is defined.

Figure 9:
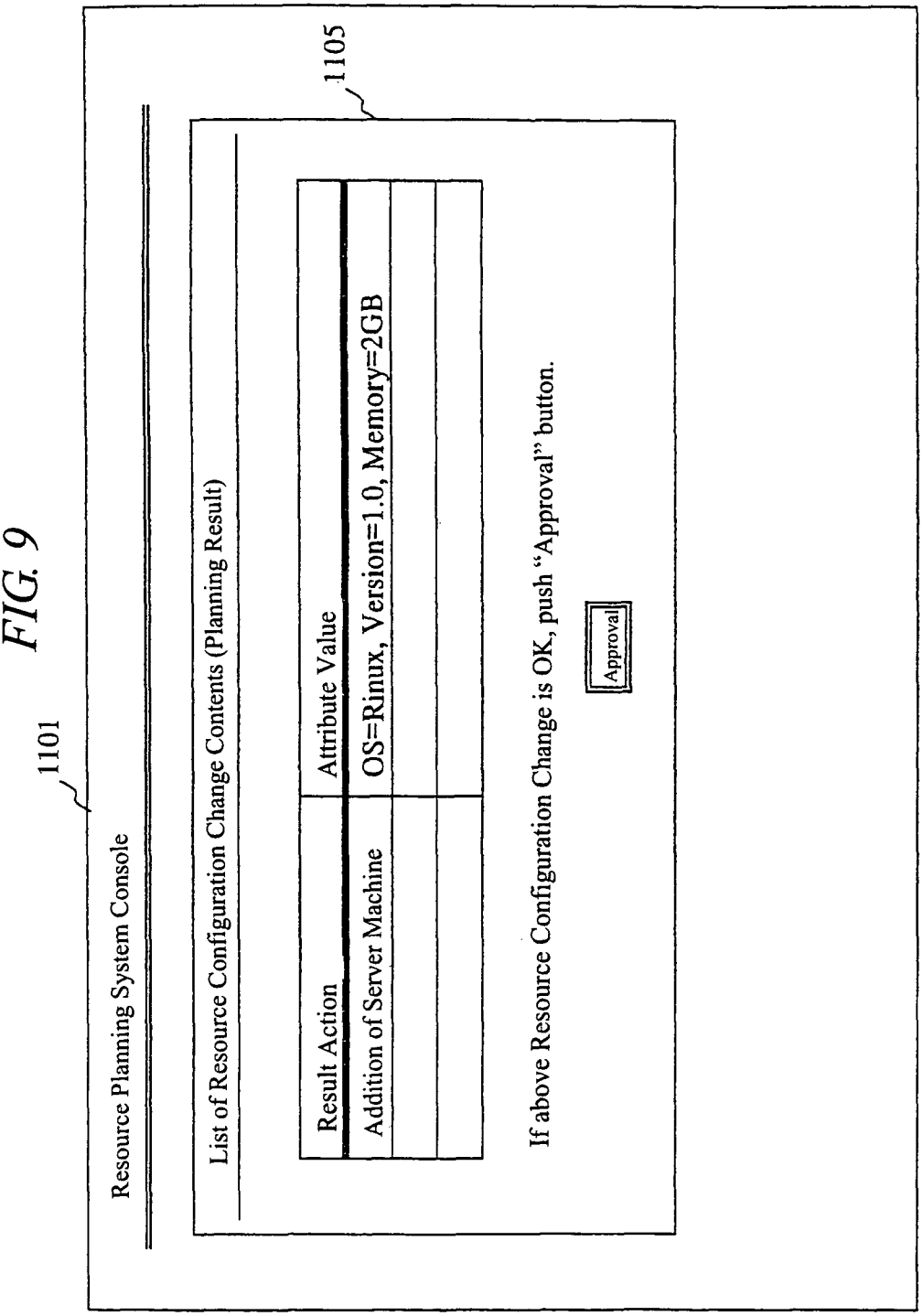
FIG. 9 is an explanatory view for showing an example of a console screen of a resource planning system and for showing a resource planning result.

As the result of the above planning algorithm execution, the contents of the resource configuration change by the resource planning engine unit 703 are determined. In the present embodiment, since the resource allocation request shown in line 2 of the resource allocation information table 901 in FIG. 3 (user ID="bar", allocation result is "NG") is rejected, the judgment of adding the above-mentioned resource is made by steps 1011 and 1012 in FIG. 7 and the resource change contents are determined similarly to a planning result confirmation screen 1105 in FIG. 9. Note that FIG. 9 shows an example displayed by the manager's program 802 that has received the notification of the resource allocation change from the resource planning system 603.

Figure 10:
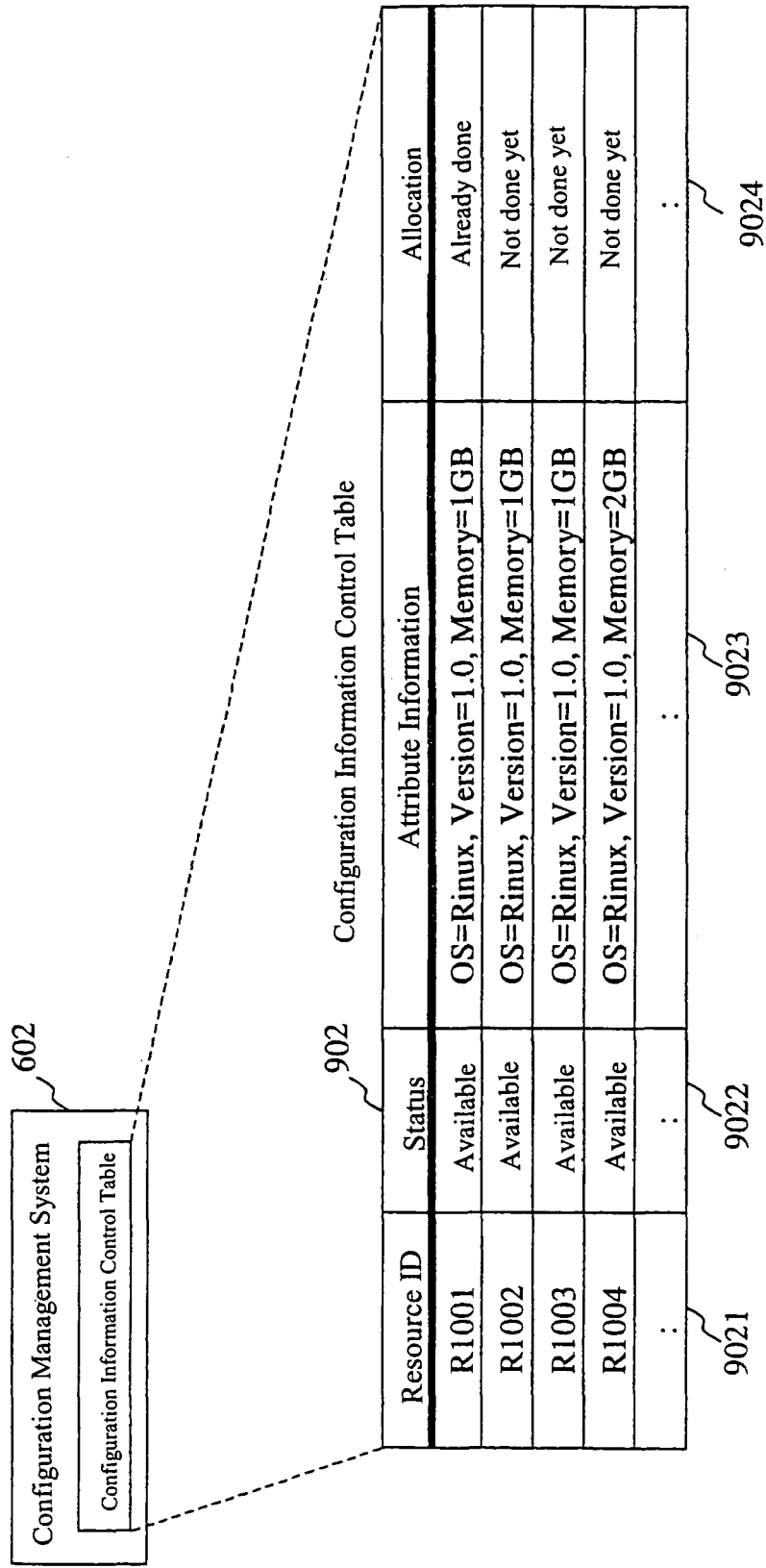
FIG. 10 is an explanatory view for showing an example of a configuration information control table and for showing the condition where the result of resource planning is reflected.

In FIG. 6, when the system manager confirms the contents of the resource configuration change and pushes an "Approval" button, the change contents are saved (step 1003). When the approval by the system manager is not obtained, the restriction condition preparing interface 1103 in FIG. 8 resets the policy/restriction conditions (step 1004) and the resource planning engine unit 703 is started once again. When the approval by the system manager is obtained, the resource planning controlling unit 705 carries out actually the resource configuration change according to the resource change contents (step 1005). Also, the changed resource configuration information is stored into the configuration management system 602 (step 1006). The resource configuration information to be stored is information reflected by the resource configuration change contents in FIG. 9 with respect to the configuration information control table 902 in FIG. 4, and is shown by the configuration information control table 902 in FIG. 10 (therein the fourth line showing a newly added resource).

The above resource planning process is instructed repeatedly and executed by the system manager, and the provision resources (management target resources 501) of the data center A are always adapted to the tendency of resource allocation requests by customers (customer's client machines 402).

Thus, it becomes possible to determine: the system resource contents that the data center A provides as the current hosting environment; and system resource contents to be provided next according to the resource allocation request contents from the clients and to the results thereof.

Further, it is possible to carry out resource planning by use of resource request information from the clients and to automatically configure resources according to customers' requests. Furthermore, it becomes possible to automatically plan resource contents to be provided according to the use history of the hosting environment (data center A) by the clients.

Moreover, it becomes is possible for the system manager at the data center A (or a service provider) to input management policies and restriction conditions and to customize system configurations depending on the domain of the data center A.

Furthermore, the IT system in the company comprises systems for processing daily butch jobs such as various application processes and salary calculations, and various online systems, whereby the system scale thereof becomes enormous. Accordingly, improvement of the usability of system resources for these business processes has become an important problem and, by the resource planning method according to the present invention, it becomes possible to optimally determine the system resource configuration that should be introduced to various applications in the system of the company and to reduce the costs by the efficient utilization of the resources.

Second Embodiment

Figure 11:
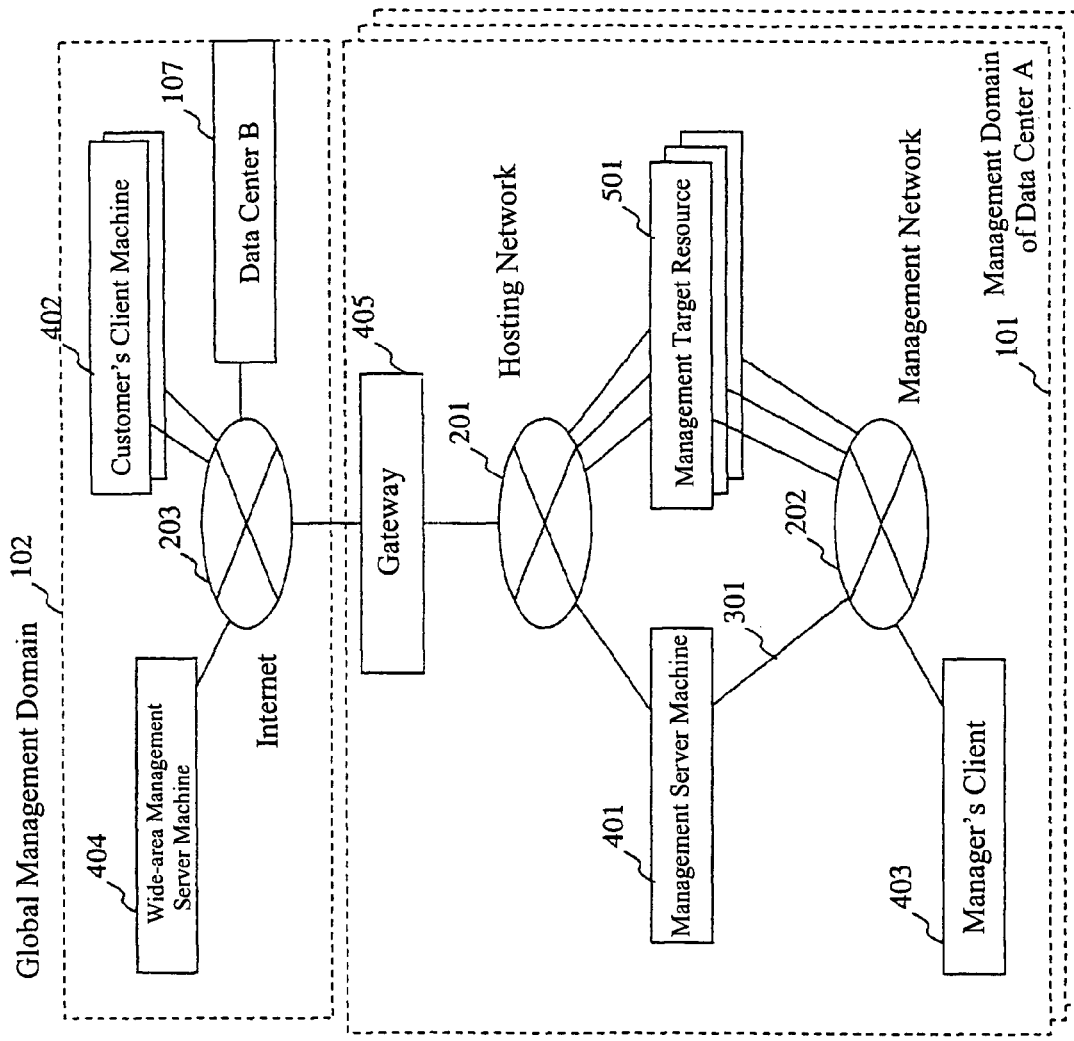
FIG. 11 shows a second embodiment and is a diagram showing the entire structure of a system.

FIG. 11 is a block diagram of the entire system including a data center A, showing a second embodiment.

In the present embodiment, a certain data center A that provides a plurality of computer resources to the clients (customer's clients) is supposed, and there is shown the configuration for planning the resources that the data center A should provide next on the basis of: the resource allocation requests accumulated in advance from the clients; the configuration of the provision resources (management target resources 501) in the data center A; and the resource configuration information provided in the entire wide-area management domain (global management domain 102). Note that the wide-area management domain may be a wide-area grid or business grid in which there are a plurality of computer resources. The business grid herein is a technique in which a grid computing technique for effectively using computer resources distributed in scientific technical calculating fields is combined with a service technique for integrating applications, thereby allowing the grid technique to be applied also to the business fields.

First, the configuration of networks, and server computers, etc. to be predicated will be explained below. FIG. 11 shows the configuration of the entire system including the data center A in the present embodiment. The data center A possesses a plurality of management target resources 501 and is connected together with a management server machine 401 and a manager's client machine 403 to a management network 202. With regard to the kinds of network connection 301, various connection means such as wire and wireless may be employed, and the kinds are not specifically limited in the present embodiment. Further, the management server machine 401 and the management target resources 501 are connected also to the hosting network 201 so as for the customers or end users of services that the customers provide to be available. The management domain 101 of the data center A shows the range in which the system manager of the data center A has authority to carry out the operations.

Note that the management server machine 401, the management target resources 501, the manager's client machine 403, the management network 202, and the hosting network 201 have the same configuration as that of the first embodiment and, hereinafter, the same configuration as the first embodiment is denoted by the same reference numerals.

The customer's client machines 402, a wide-area management server machine 404, and a management domain 107 of a data center "B" are connected to Internet 203, and the internet 203 and the hosting network 201 of the data center A are connected to each other via the gateway 405. Note that the data center B is configured in the same manner as the data center A and provides the management target resources to the customer's client machines 402.

The wide-area management server machine 404 functions as a global registry, which refers to the resource allocation information or resource configuration information on the wide-area management domain 102 and discloses the collected resource allocation information to the customer's client machines 402 and the management server machine 401.

Figure 12:
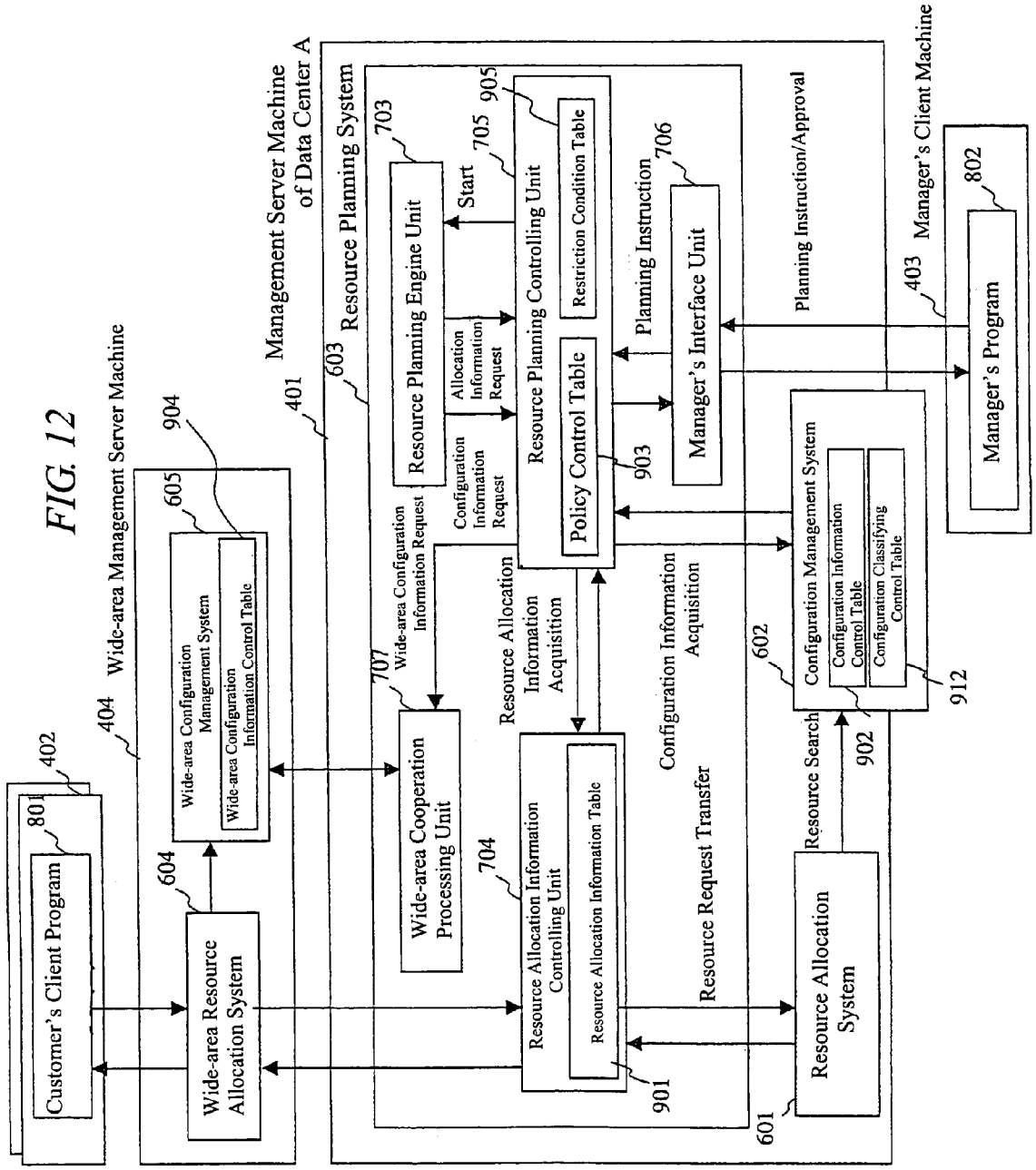
FIG. 12 is a block diagram of a program installed in a management server.

Next, the program configuration of the entire system will be explained below. FIG. 12 shows a program configuration of the present embodiment, wherein, similarly to the first embodiment, the resource allocation system 601, the configuration management system 602, and the resource planning system 603 operate on the management server machine 401. The resource planning system 603 is provided with a wide-area cooperation processing unit 707 that cooperates with the wide-area management server machine 404, in addition to the resource planning engine unit 703, the resource allocation information controlling unit 704, the resource planning controlling unit 705, and the manager's interface unit 706 that are the same configuration as that of the first embodiment.

Also, the wide-area resource allocation system 604 that allocates the resources on the global management domain 102, and the wide-area configuration management system 605 that controls information of the management target resources on the global management domain 102 operate on the wide-area management server machine 404.

The wide-area configuration management system 605 includes a wide-area configuration information control table 904 as shown in FIG. 13, and the wide-area configuration information control table 904 includes the configuration information of resources that the respective local management domains including the data center A provide.

In the wide-area configuration information control table 904, as shown in FIG. 13, records are formed per resource ID 9041 that is an identifier of the management target resource on the global management domain 102. Each record includes: attribute information 9042 showing the resource kinds etc. (for example, OS kind, version, and memory capacity, etc. in the case where the management target resource 501 is a server machine); the number of resources (units) 9043; and a position (domain) 9044 of the resource.

In the above environment, on the premise of the resource planning system shown in the present embodiment, there will be below described the flow of a wide-area resource allocation process by: the wide-area resource allocation system 604 that operates on the wide area management server machine 404; the wide-area configuration management system 605; the resource allocation system 601; and the configuration management system 602.

First, a customer's client program 801 that operates on the customer's client machines 402 outputs a resource allocation request to the wide-area resource allocation system 604. The wide-area resource allocation system 604 carries out a search to the wide-area configuration management system 605 on the basis of the attribute information included in the resource allocation request information.

The wide-area configuration management system 605 controls a wide-area configuration information control table 904 shown in FIG. 13 and, when any resource that corresponds to the attribute information is found, sends back to a management domain name that provides the corresponding resource (data center A in this case).

The wide-area resource allocation system 604, by use of the received management domain name, for example, solves an access point of the data center A by a DNS server etc. and transfers the resource allocation request to the resource allocation information controlling unit 704 of the resource planning system 603 of the data center A.

Next, the resource allocation information controlling unit 704 stores the contents of the above resource allocation request into a resource allocation information table 901 shown in FIG. 3, and transfers the resource allocation request to the resource allocation system 601.

The resource allocation system 601, which has received the resource allocation request, carries out a search to the configuration management system 602 on the basis of the attribute information included in the resource allocation request information. The configuration management system 602 controls a configuration information control table 902 shown in FIG. 4 and, when a resource that corresponds to the attribute information is found, notifies configuration information as the search result to the resource allocation system 601 and marks the fact that the above-mentioned resource has been already allocated into the configuration information control table 902.

The resource allocation system 601 transfers the notified configuration information to the resource allocation information controlling unit 704, and the resource allocation information controlling unit 704 stores the allocation result onto the resource allocation information table 901 and then notifies the resource allocation result to the wide-area resource allocation system 604. The wide-area resource allocation system 604 transfers the notified resource allocation result to the customer's client program 801.

On the premise that the history of the resource allocation requests and results is left in the resource allocation information control table as a result of the above, the flow of the resource planning process will be explained below. A main flow of the resource planning process is shown in FIG. 14 and is the same as that in FIG. 6 explained in the first embodiment, except that step 1032 of registering the resource change contents that are planning results to the wide-area configuration management system 605 is added thereto.

Figure 14:
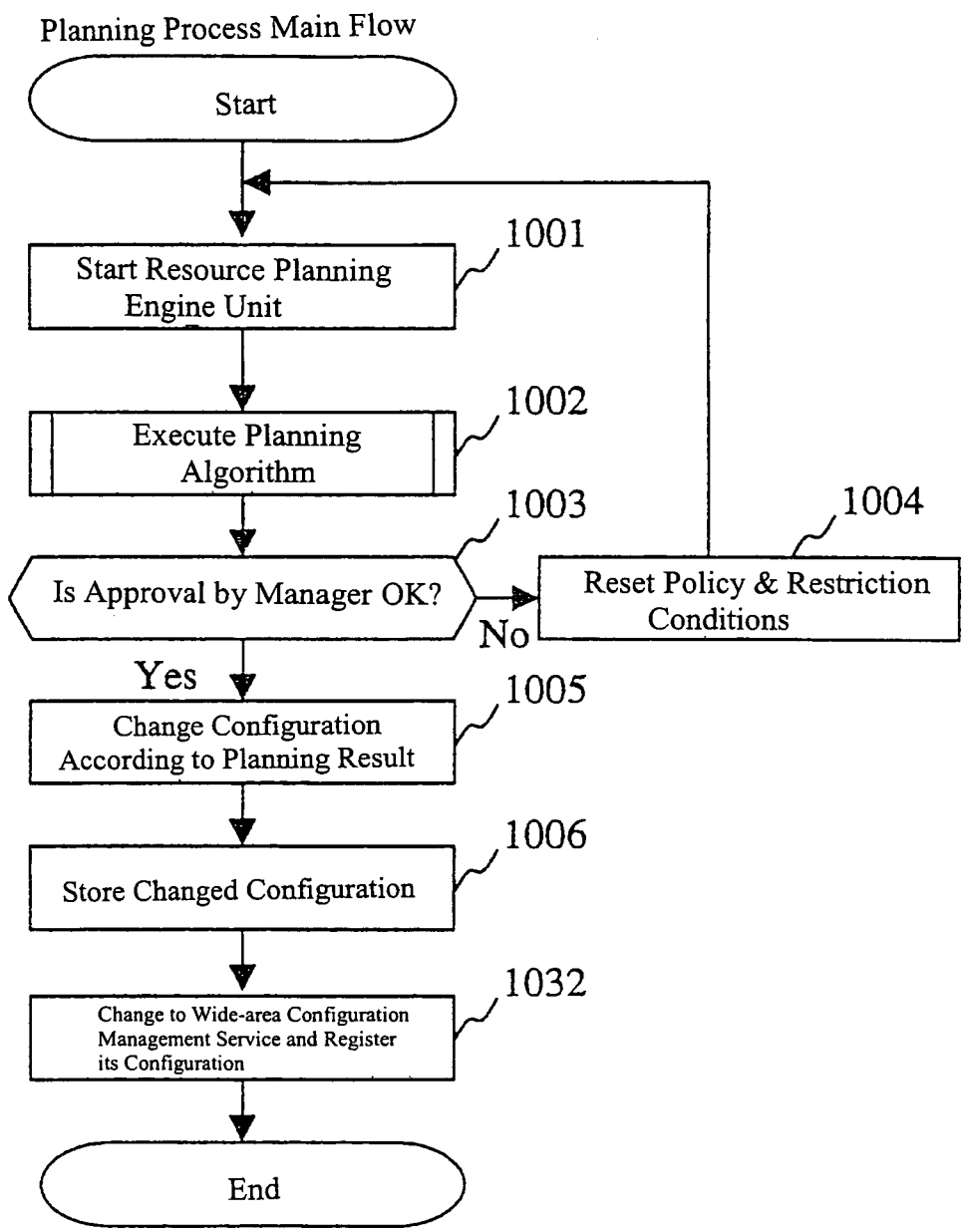
FIG. 14 is a flow chart showing a main routine of a planning process.

In FIG. 14, in the same manner as that in the first embodiment, the resource planning engine unit 703 is started by the resource planning engine unit 705 and thereby the resource configuration change contents are determined.

When the system manager confirms the resource configuration change contents and pushes the "Approval" button, the change contents are saved (step 1003). When the approval by the system manager is not obtained, in the restriction condition preparing interface 1103 in FIG. 8, the policy/restriction conditions are reset (step 1004) and the resource planning engine unit 703 is started once again. When the approval by the system manager is obtained, the resource planning controlling unit 705 carries out actual changes of the resource configurations according to the resource change contents (step 1005). Also, the changed resource configuration information is stored into the configuration management system 602 (step 1006). The resource configuration information to be stored is information reflected by the resource configuration change contents in FIG. 9 with respect to the configuration information control table 902 in FIG. 4 and is shown in the configuration information control table 902 in FIG. 10 (therein the fourth line showing the newly added resource).

Figure 15:
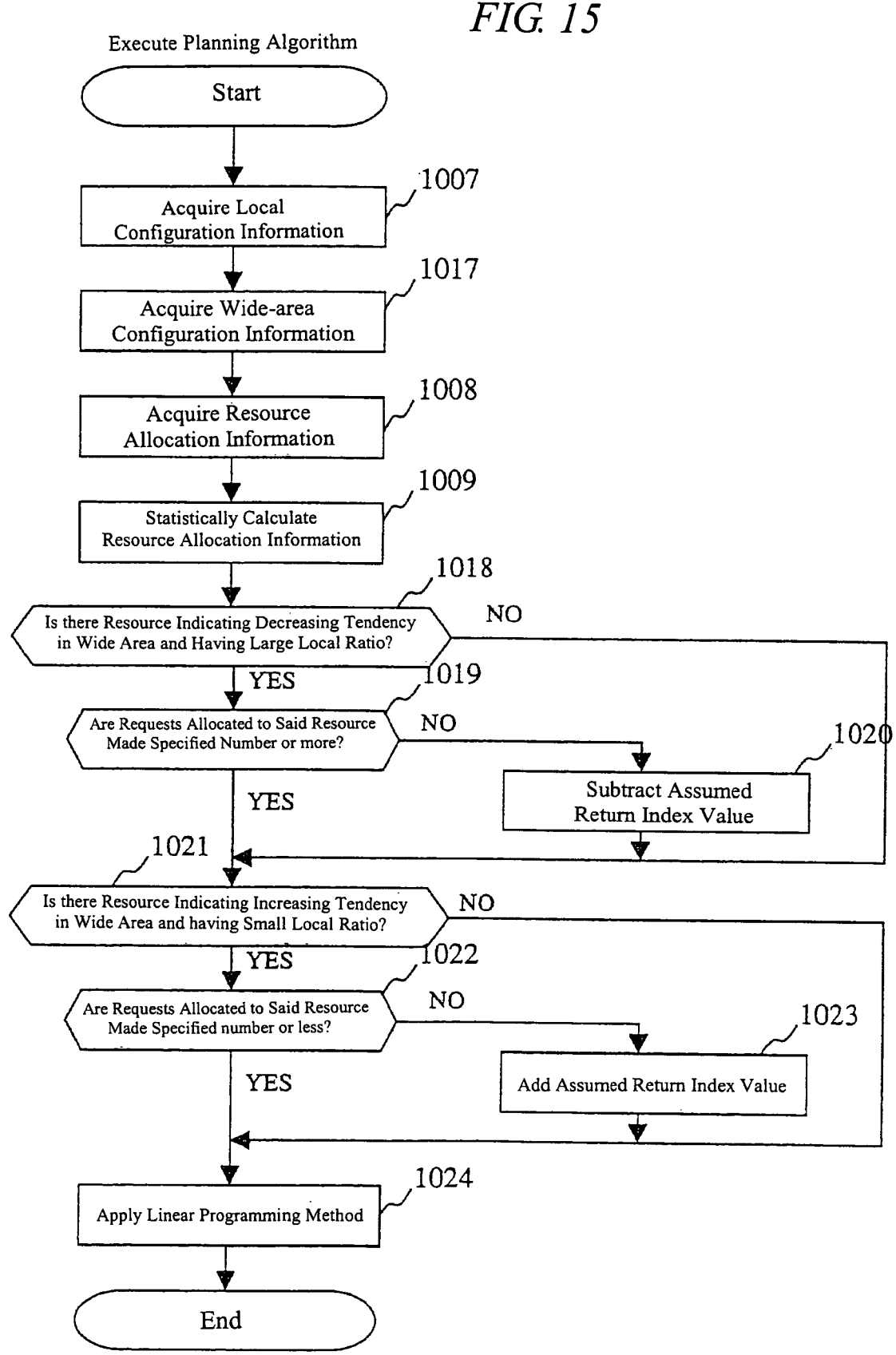
FIG. 15 is a flow chart showing an example of a planning algorithm executed in a resource planning engine unit.

FIG. 15 shows an example of a wide-area resource planning algorithm to be executed in the step 1002 of FIG. 6, and this algorithm is to appropriately change a provision resource configuration on the basis of the tendency of resources that are provided in the data center A and the wide area and on the basis of the past resource allocation history in the data center A.

Hereinafter, according to the flow chart shown in FIG. 15, concrete processing contents will be explained. First, the started resource planning engine unit 703 outputs a configuration information acquisition request of the resource that the data center A provides to the resource planning controlling unit 705. The resource planning controlling unit 705 acquires the contents of the configuration information control table 902 from the configuration management system 602 and sends them back to the resource planning engine unit 703 (step 1007).

Next, the resource planning engine unit 703 similarly outputs the resource allocation information acquisition request in the wide area to the resource planning controlling unit 705. The resource planning controlling unit 705 requests a wide-area cooperation processing unit 707 to acquire wide-area resource configuration information, and the wide-area cooperation processing unit 707 requests configuration information to the wide-area configuration management system 605 that operates on a wide-area management server machine 404. When the wide-area configuration management system 605 sends back the requested configuration information to the wide-area cooperation processing unit 707, the wide-area cooperation processing unit 707 transfers the configuration information to the resource planning controlling unit 705. Further, the resource planning controlling unit 705 transfers the configuration information to the resource planning engine unit 703 (step 1017).

Next, the resource planning engine unit 703 similarly outputs an acquisition request of local resource allocation information to the resource planning controlling unit 705. The resource planning controlling unit 705 acquires the contents of the resource allocation information table 901 from the resource allocation information controlling unit 704 and sends them back to the resource planning engine unit 703 (step 1008).

The resource planning engine unit 703, which has acquired these information items, carries out statistic calculations of the resource allocation information (step 1009).

Next, the resource planning engine unit 703 collects the statistics of the above-acquired wide-area resource configuration information and, when there is a resource that shows a decreasing tendency therein, judges whether the ratio of the same system resource to other resources in the local (in the management domain 101) is greater than that that in the wide area (step 1018).

As a result of the step 1018, when the local ratio of resource is greater than the wide-area ratio, it is judged whether the allocation requests to the above-mentioned resource is carried out a specified number or more (step 1019). If the allocation requests are not carried out the specified number or more, an assumed return index value to be described later is subtracted (step 1020).

On the contrary, in the statistics of the acquired wide-area resource configuration information, if there is the resource that shows an increasing tendency, it is judged whether the ratio of the same system resource to other resources is smaller than that in the wide area (step 1021).

As a result of the step 1021, if the local ratio of resource is smaller than the wide-area ratio, it is judged whether the allocation requests to the above-mentioned resource are carried out only a specified number or less (step 1019) and, when the allocation requests are not carried out the specified number or less, the assumed return index value is added (step 1020).

The assumed return index value in the above processes is a relative value showing a gain expectation (or benefit indicator) of resources in the above-mentioned data center A.

Figure 16:
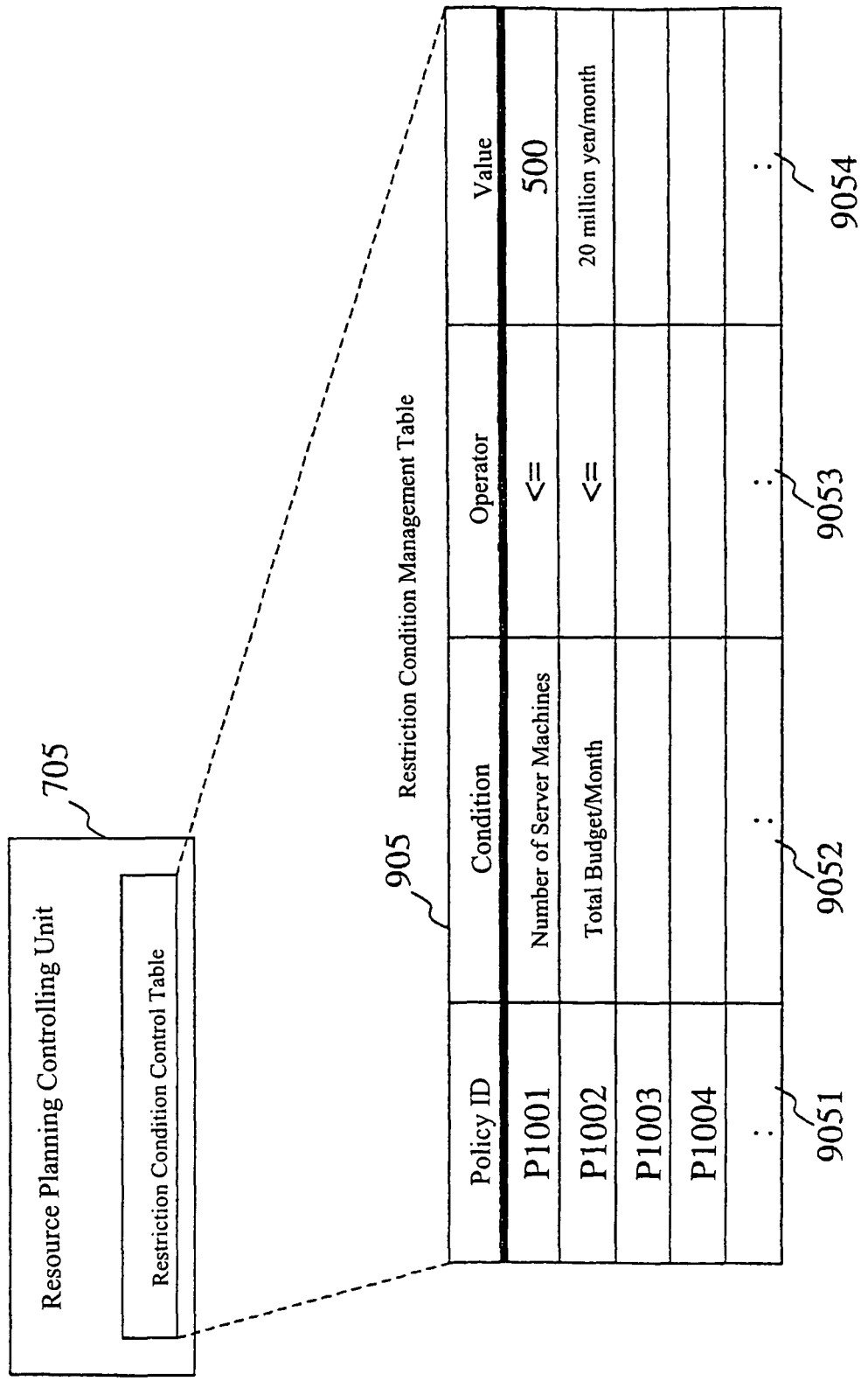
FIG. 16 is an explanatory view showing an example of a configuration classifying control table.

Finally, the resource planning engine unit 703 maximizes the summation of the assumed return index values, and obtains a resource configuration ratio that satisfies the restriction conditions shown in FIG. 16 preset by the system manager using the console screen in FIG. 8 through a problem-solving-method by a linear programming, and regards the obtained result as a planning result (step 1024).

FIG. 16 shows a restriction condition table 905 that is stored in the resource planning controlling unit.

In this restriction condition table 905, a policy ID 9051 to become an identifier of the restriction condition, a condition 9052 corresponding to this policy ID 9031, an operator 9053 that judges conditions, and a value 9054 to become a threshold value are associated with one another. For example, in the policy ID="P1001" of the first line, such a restriction condition that the number of server machines is 500 units or less is indicated and, in the ID="P1002", such a restriction condition that the monthly total budget is 20 million yen or less is indicated.

In the present embodiment, it is assumed that the resource configuration that the data center A provides in its default status is as shown in the wide-area configuration information control table 904 in FIG. 13 and the resource shown in the first line is in shortage to the assumed return index value and the resource shown in the third line is in excess.

Figure 17:
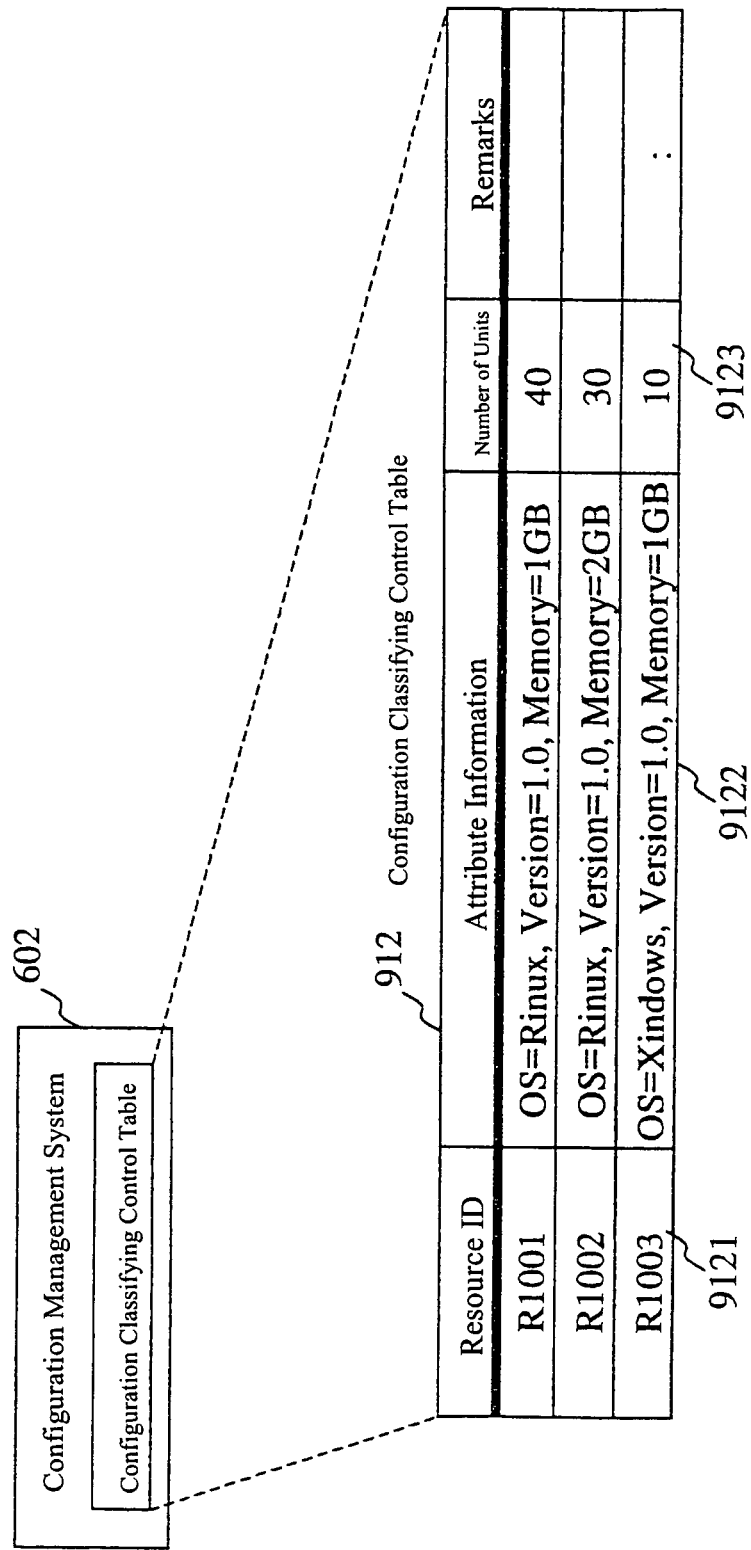
FIG. 17 is an explanatory view showing an example of a restriction condition table.

As a result of the step 1024, the configuration information as the planning result in the data center A is shown in a configuration classifying control table 912 in FIG. 17. In this configuration classifying control table, a resource ID 9121 as an identifier showing the kinds of the management target resources 501, attribute information 9122, and a value 9123 corresponding to this resource ID 9121 are associated with one another. Namely, this configuration classifying control table 912 comprises records in which the configuration information control table 902 shown in FIG. 4 is collected per kind of the management target resources 501. Also, the resource planning controlling unit 705 notifies this configuration classifying control table 912 via the wide-area cooperation processing unit 707 to the wide-area configuration information control table 904 of the wide-area configuration management system 605, whereby the information of the wide-area configuration management system 605 becomes latest.

As explained above, the resource planning process is instructed and executed by the system manager, whereby the provision resource of the data center A is changed to the resource configuration so as to meet the tendency of the provision resources in the wide area (global management domain 102) and the management target resources of the data center A is configured so as to meet customer's needs. Therefore, it is possible to maximize the gains.

Further, in the wide-area configuration management system 605, the kind and number of resources of respective management domains that provide resources are controlled and disclosed, so that it is possible to easily grasp the resources that the respective domains provide in the wide-area cooperation and to regard them as indexes of the management target resources to be provided.

Furthermore, in the data center A which a plurality of companies outsource, it is required to determine system resource configurations that cope with various client needs, and maximize the gains of the data center A. By the present invention, it is possible to automatically carry out this planning of a system resource configuration and to optimize the IT infrastructure investment costs of the data center A and to expand the gains thereof.

Third Embodiment

In this third embodiment, there will be described an operation of a resource planning system for determining the resource that the data center A should provide next, on the basis of the resource allocation request from the client, which provides a plurality of computer resources to the client and is assumed by a certain data center A and is accumulated in advance, the configuration of provision resources in the data center A, and a history of the past planning results.

The configuration of a network, a server computer, and the like to be premised in the present embodiment is same as the system configuration in the first embodiment (FIG. 1).

Figure 18:
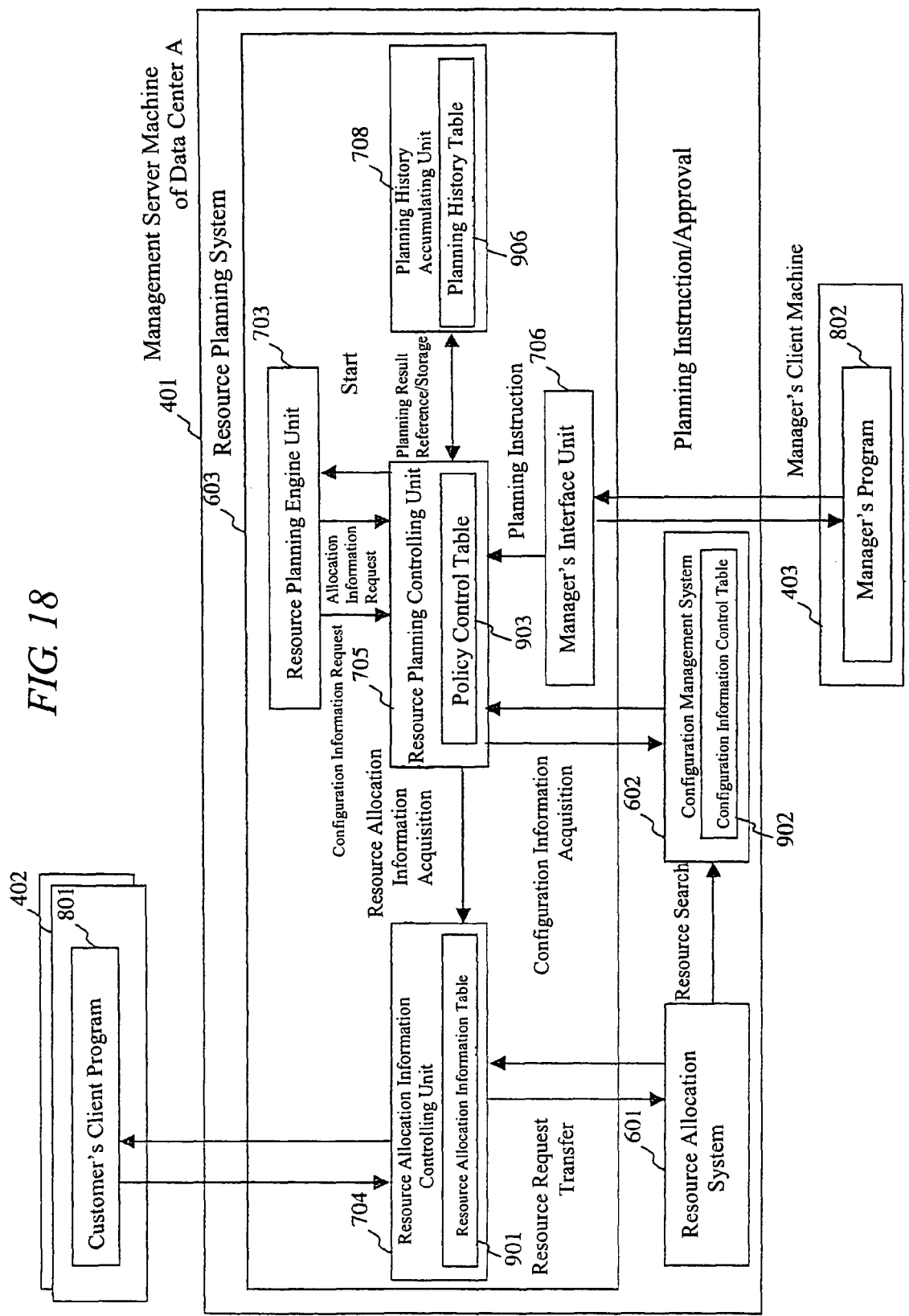
FIG. 18 shows a three embodiment and is a diagram showing a program configuration of a management server.

Next, a program configuration of the entire system will be explained below. FIG. 18 shows a program configuration in the present embodiment, wherein a planning history accumulating unit 708 is added in the resource planning system 603 in comparison with the program configuration in the first embodiment (FIG. 2), so that the history of the past resource planning results may be accumulated and referred to.

Figure 19:
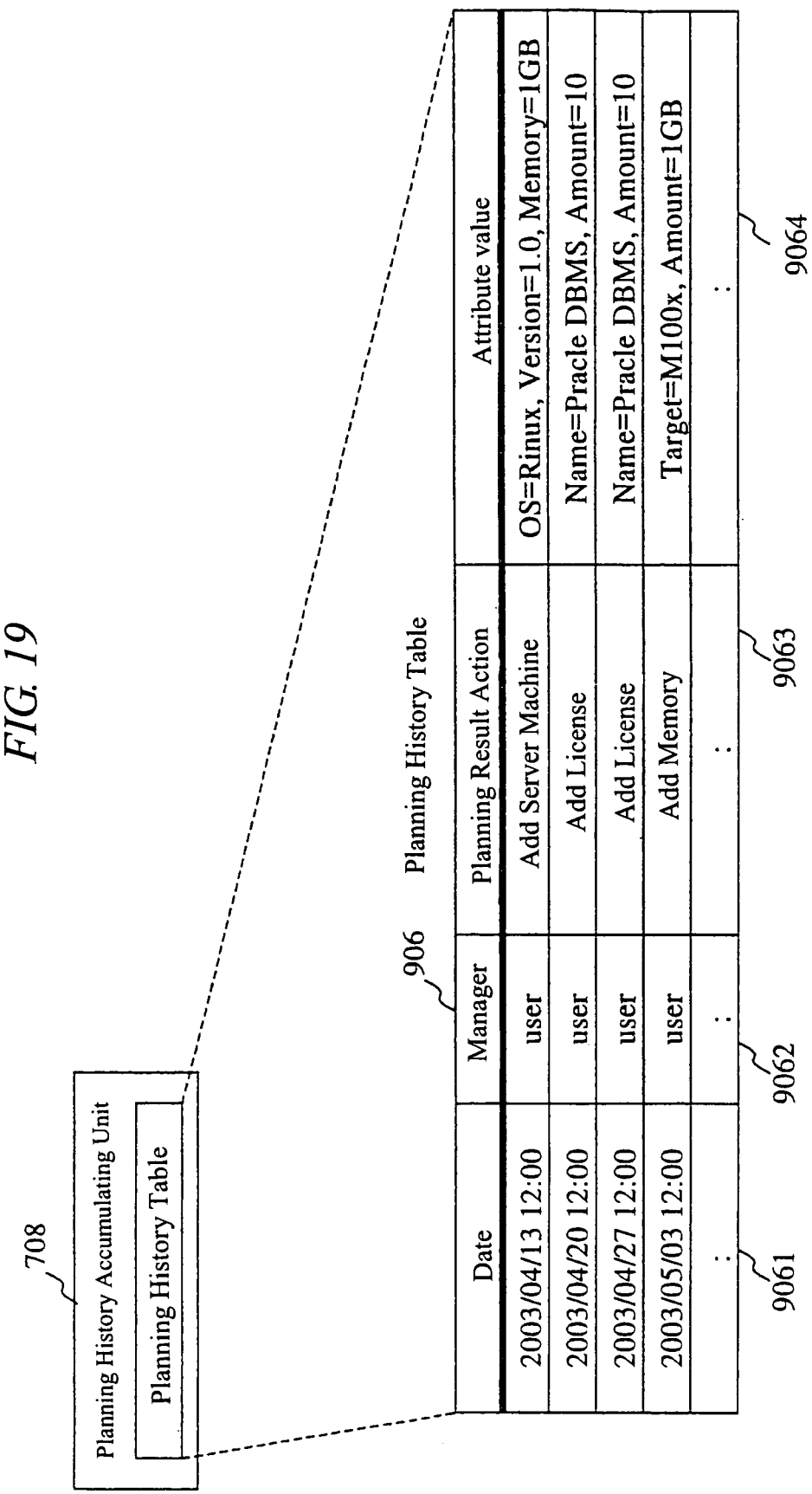
FIG. 19 is an explanatory view showing an example of a planning history table.

As shown in FIG. 19, the planning history accumulating unit 708 is equipped with a planning history table 906. The planning history table 906 comprises a manager 9062 who carried out planning, planning result actions 9063 showing the contents of the executed planning, and an attribute value 9064 of target resource, in accordance with a date (date and time) 9061 on which the planning is executed.

Figure 20:
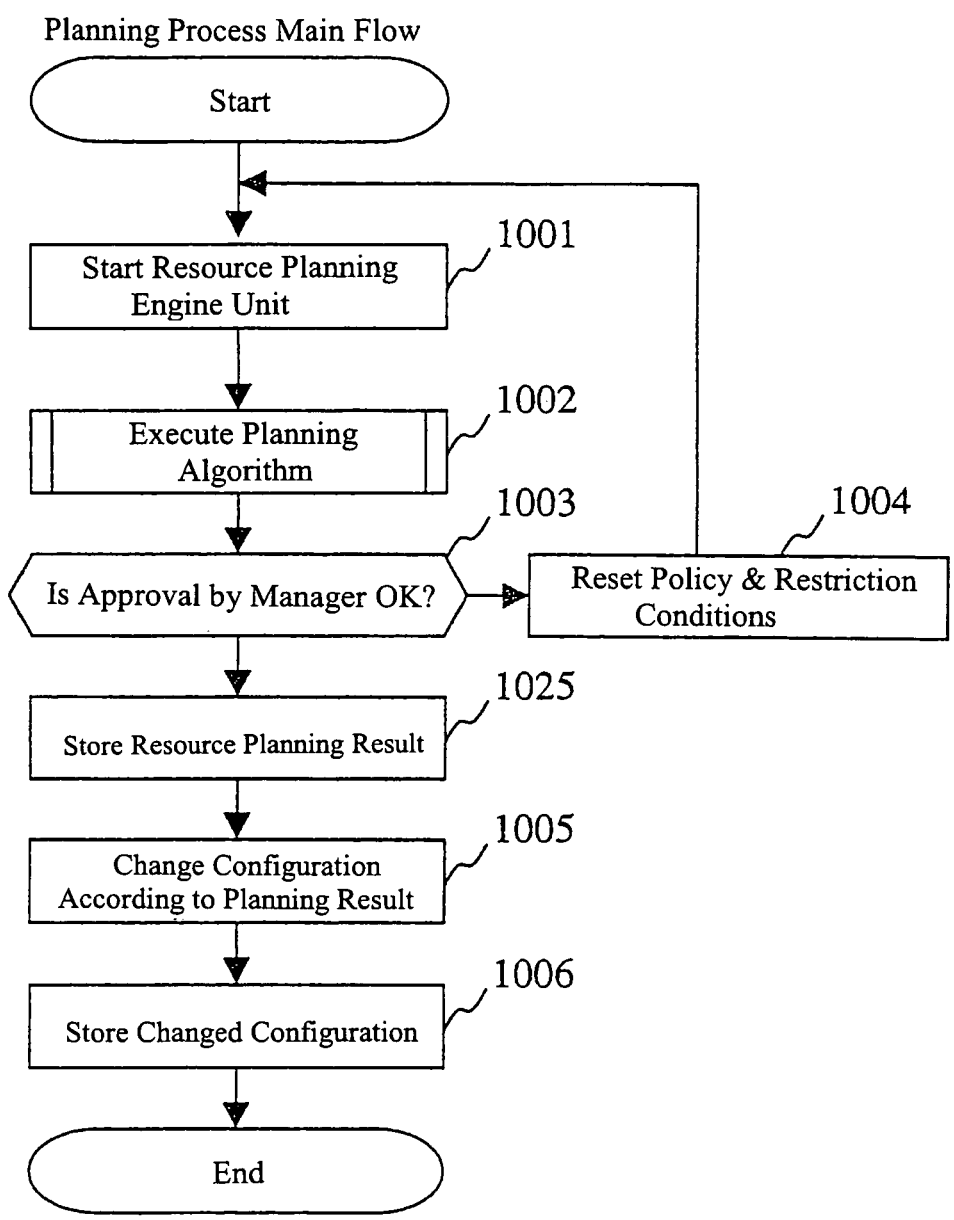
FIG. 20 is a flow chart showing a main routine of a planning process.

FIG. 20 shows a main flow chart of a resource planning process according to the present embodiment, wherein a step 1025 of storing results obtained by executing the resource planning is added into the main flow chart shown in FIG. 6 of the first embodiment.

Figure 21:
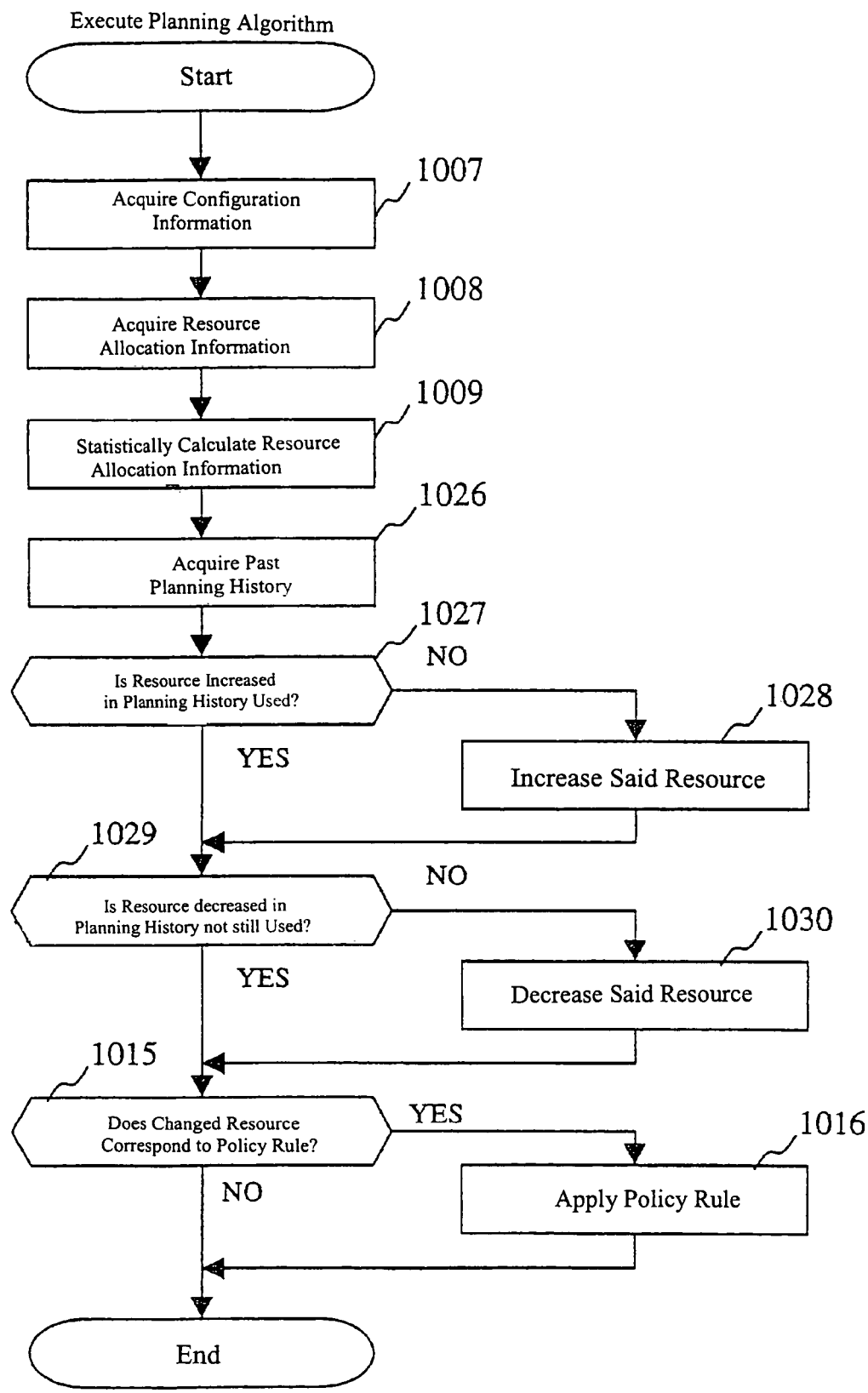
FIG. 21 is a flow chart showing an example of a planning algorithm executed in a resource planning engine unit.

Hereinafter, in the case where the planning results as shown in the planning history table 906 in FIG. 19 are stored as a history, an algorithm of the resource planning engine unit 703 will be explained based on a flow chart shown in FIG. 21.

When started by the resource planning controlling unit 705, the resource planning engine unit 703 carries out the acquisition of the resource configuration information (step 1007), the acquisition of the resource allocation information (step 1008), and the statistics of the request amounts to the resources (step 1009), similarly to the first embodiment, and then requests the history information of the past planning results to the resource planning controlling unit 705.

The resource planning controlling unit 705 inquires about the history of the past planning results to the planning history accumulating unit 708, and transfers the result to the resource planning engine unit (step 1027). The resource planning engine unit 703 that has acquired the planning history calculates the allocation conditions of resources added in the past, and, when the allocation conditions show a certain allocation ratio or higher, makes a judgment to further add the above-mentioned resources (steps 1027 and 1028). On the contrary, the resource planning engine unit also calculates the allocation conditions of the resources decreased in the past, and, when the allocation conditions show a certain allocation ratio or lower, makes a judgment to further decrease the above-mentioned resources (steps 1029 and 1030). Thereafter, the results obtained by applying the policy rules are determined as the planning results in the steps 1015 and 1016 similarly to the first embodiment.

Figure 22:
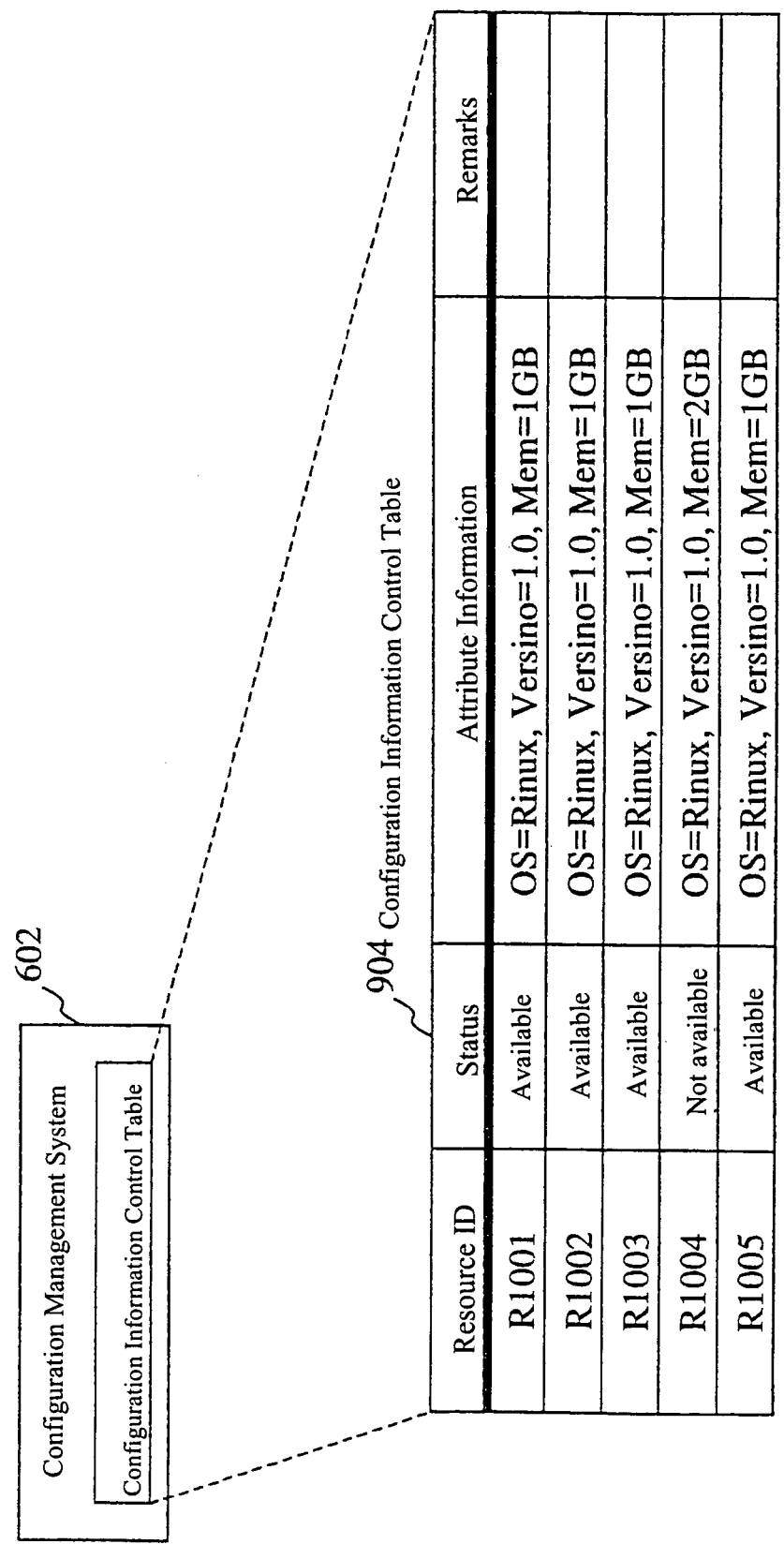
FIG. 22 is an explanatory view for showing an example of a configuration information control table.

The above planning execution results are stored for use again in the next planning, in the step 1025 of FIG. 20. Note that, in the present embodiment, if the resource allocation request shown in the resource allocation information table 901 of FIG. 3 is issued, the resource allocation request is issued to the resource added at the time shown in the first line of the planning history table 906 of FIG. 19 and the planning result becomes one adding the above-mentioned resource. Therefore, the resource configuration of the data center A after completion of the resource planning process becomes shown in the configuration information control table 902 of FIG. 22. (The fifth line therein shows a newly added resource.)

Also, in order for the history of planning results to be confirmed by the system manager, the manager's interface unit 706 may provide a function to confirm the planning result history, and may list up the resource change history as past planning results on a planning result history confirming screen 1107 as shown in FIG. 23.

In this manner, by use of the history of resource request information from the clients, it is possible to carry out the resource planning by judging the increasing or decreasing tendency of the resources.

Fourth Embodiment

Figure 24:
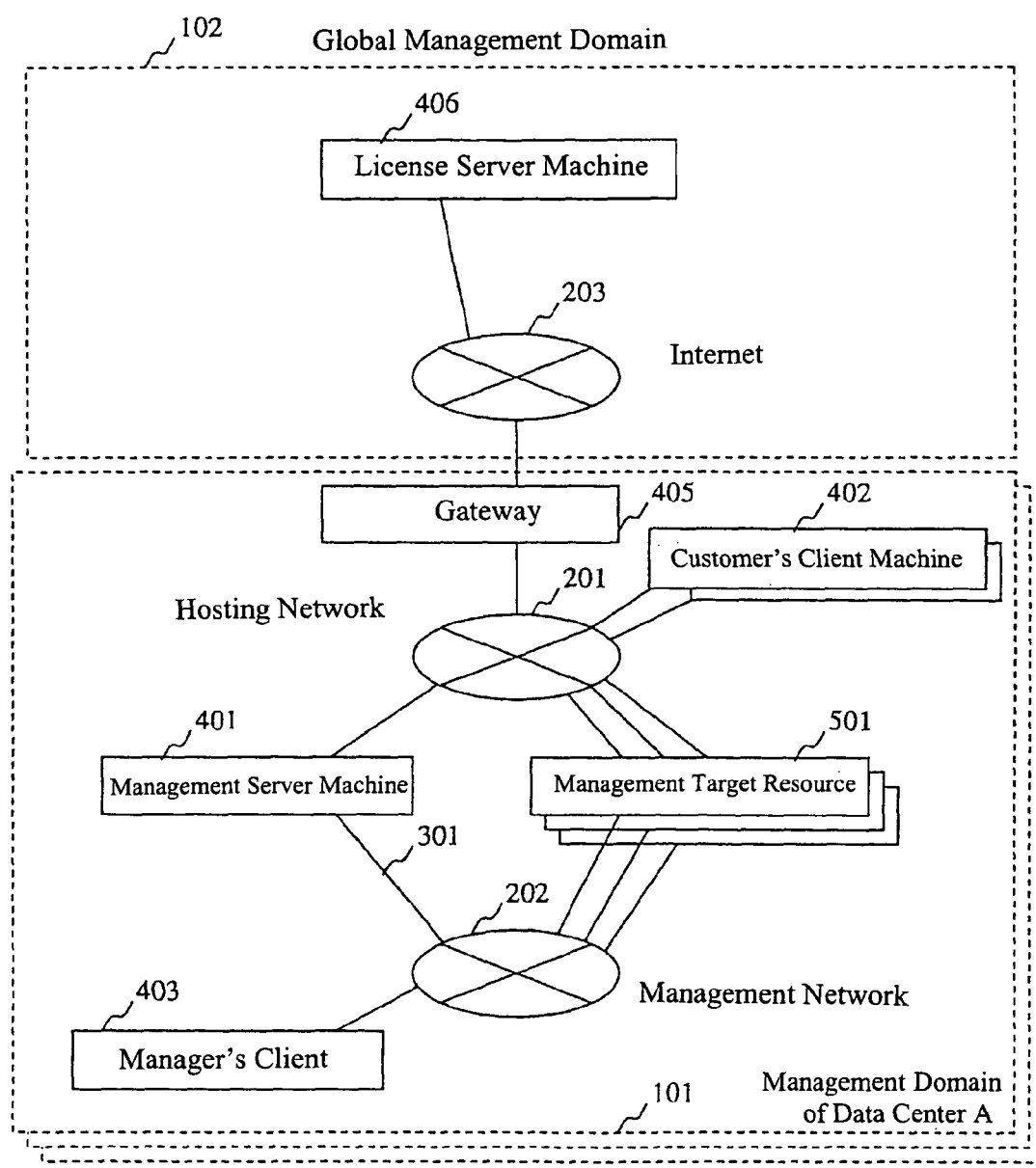
FIG. 24 shows a fourth embodiment and is a diagram showing the entire structure of a system.

FIG. 24 shows a fourth embodiment, and there will below be described an operation of a resource planning system for planning the resource that the data center A should provide next and for consequently adding/deleting necessary software license, on the basis of the resource allocation request from the client, which provides a plurality of computer resources to the client and is assumed by a certain data center A and is accumulated in advance, and the configuration of provision resources in the data center A.

First, the configuration of networks, server computers and the likes that are premised will be explained. FIG. 24 shows the entire system including the data center A in the present embodiment. In comparison with the system configuration diagram in the second embodiment (FIG. 11), a license server machine 406 connected to Internet 203 is added thereto and is connected to the data center A via the gateway 405. The license server machine 406 provides a server function to dynamically add/delete the software licenses that the data center A requires.

Figure 25:
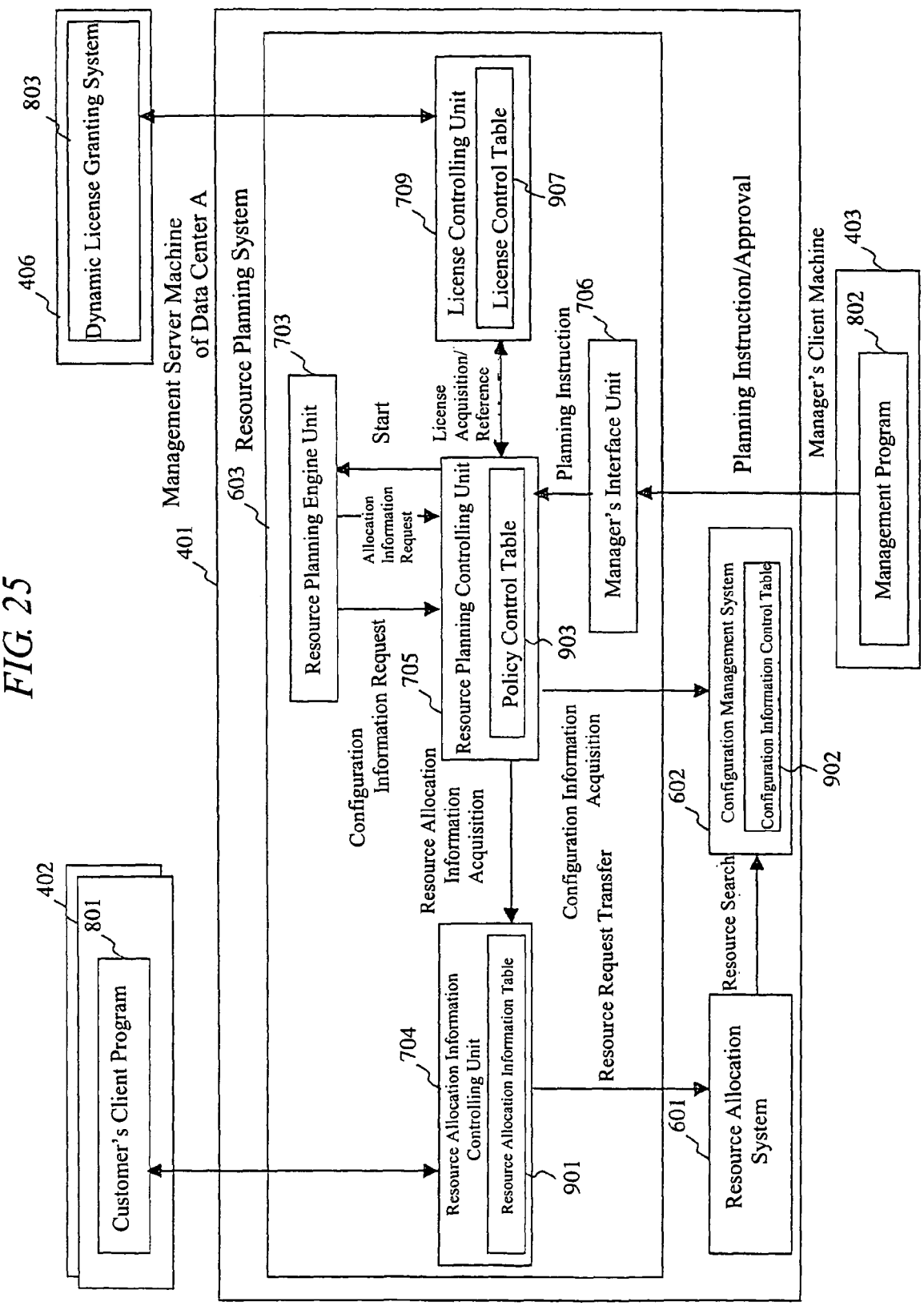
FIG. 25 is a diagram showing a configuration of a program installed in a management server.
Figure 26:
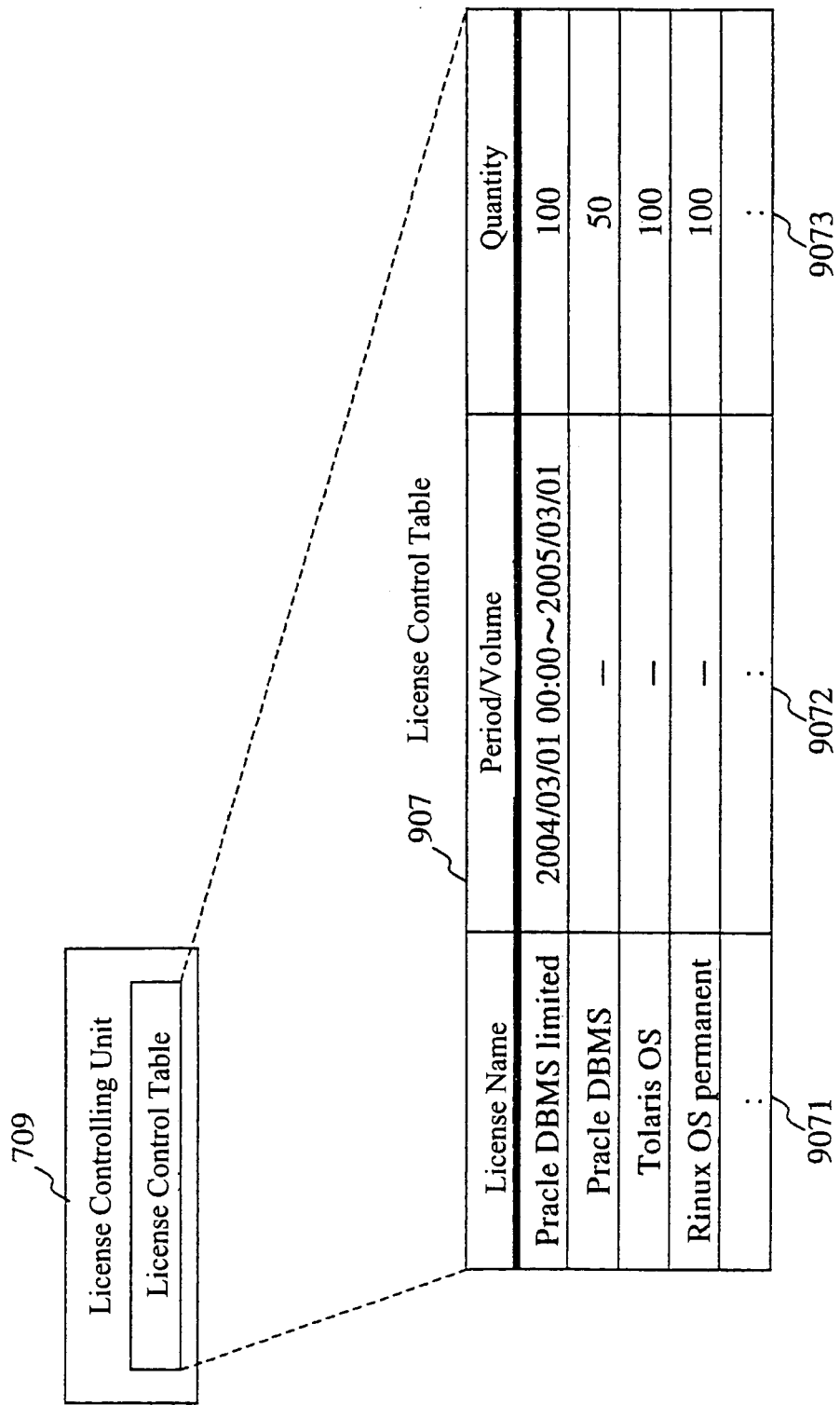
FIG. 26 is an explanatory view for showing an example of a license control table.

Next, a program configuration of the entire system will be explained below. FIG. 25 shows a program configuration of the present embodiment, wherein, in comparison with the program configuration in the first embodiment (FIG. 1), a license controlling unit 709 is added in the resource planning system 603 and provides a dynamic license addition/deletion function to a resource planning controlling unit. FIG. 26 shows the contents of a license control table 907 that the license controlling unit 709 retains, and shows a list of license assets that the data center A possesses. The license control table 907 comprises a license name 9071 showing kinds of software, a license period 9072, and the number of licenses.

Hereinafter, the flow of the resource planning process in the present embodiment will be explained. In the present embodiment, the main flow of the resource planning process is same as that explained in the first embodiment shown in FIG. 6.

Figure 27:
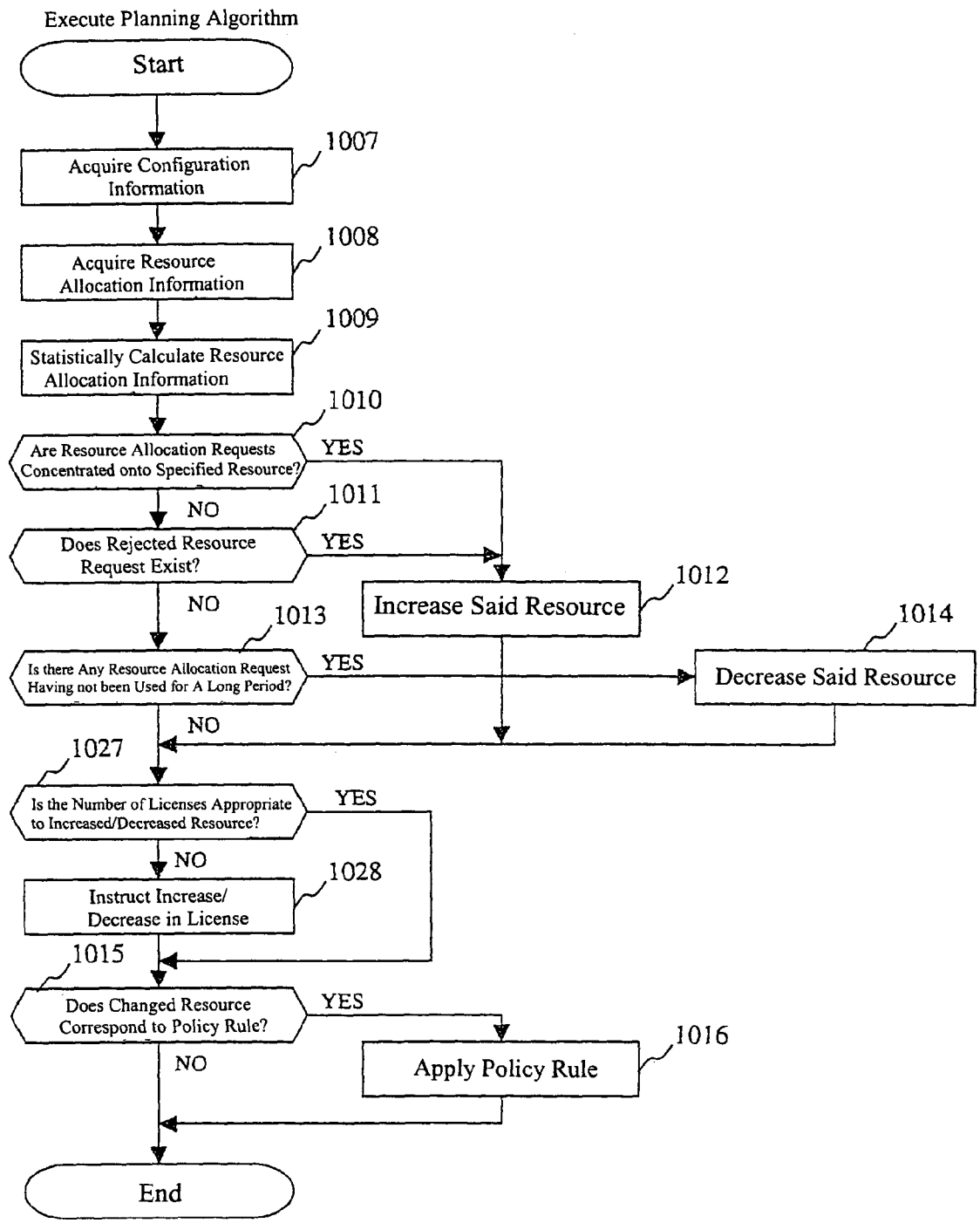
FIG. 27 is a flow chart showing an example of a planning algorithm executed in a resource planning engine unit.

FIG. 27 shows a flow chart of a planning algorithm in the present embodiment, wherein, if there is an increase or decrease in the number of software licenses that the data center A retains at present as a result of the resource planning in the steps 1027 and 1028, the resource planning engine unit 703 requests the resource planning controlling unit 705 to change the number of licenses.

The resource planning controlling unit 705 transfers the request for changing the license number to the license controlling unit 709, and the license controlling unit 709 carries out the license change request to a dynamic license granting system 803 that operates on the license server machine 406, and stores the result thereof into the license control table 907 (FIG. 26).

Figure 28:
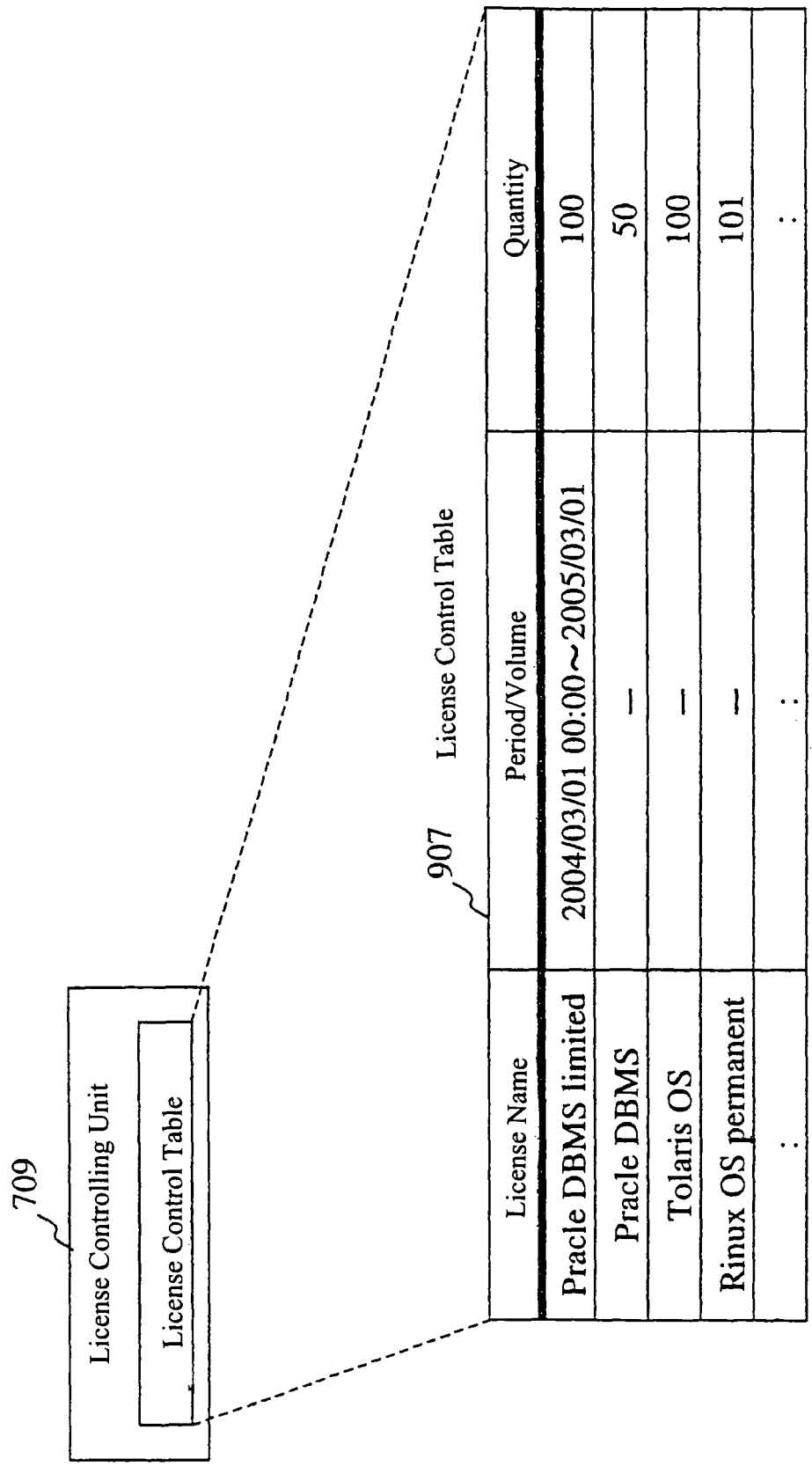
FIG. 28 is an explanatory view for showing a planning result and for showing an example of a license control table.

Herein, if it is assumed that the planning process is executed under exactly the same conditions as those in the first embodiment except for the license acquisition process, then the contents of the license control table 907 in the license controlling unit 709 after completion of execution of the main flow in FIG. 6 become shown in FIG. 28. Namely, according to the resource configuration changing contents shown in FIG. 9 of the first embodiment, the "Rinux OS" license is added thereto.

Fifth Embodiment

Figure 29:
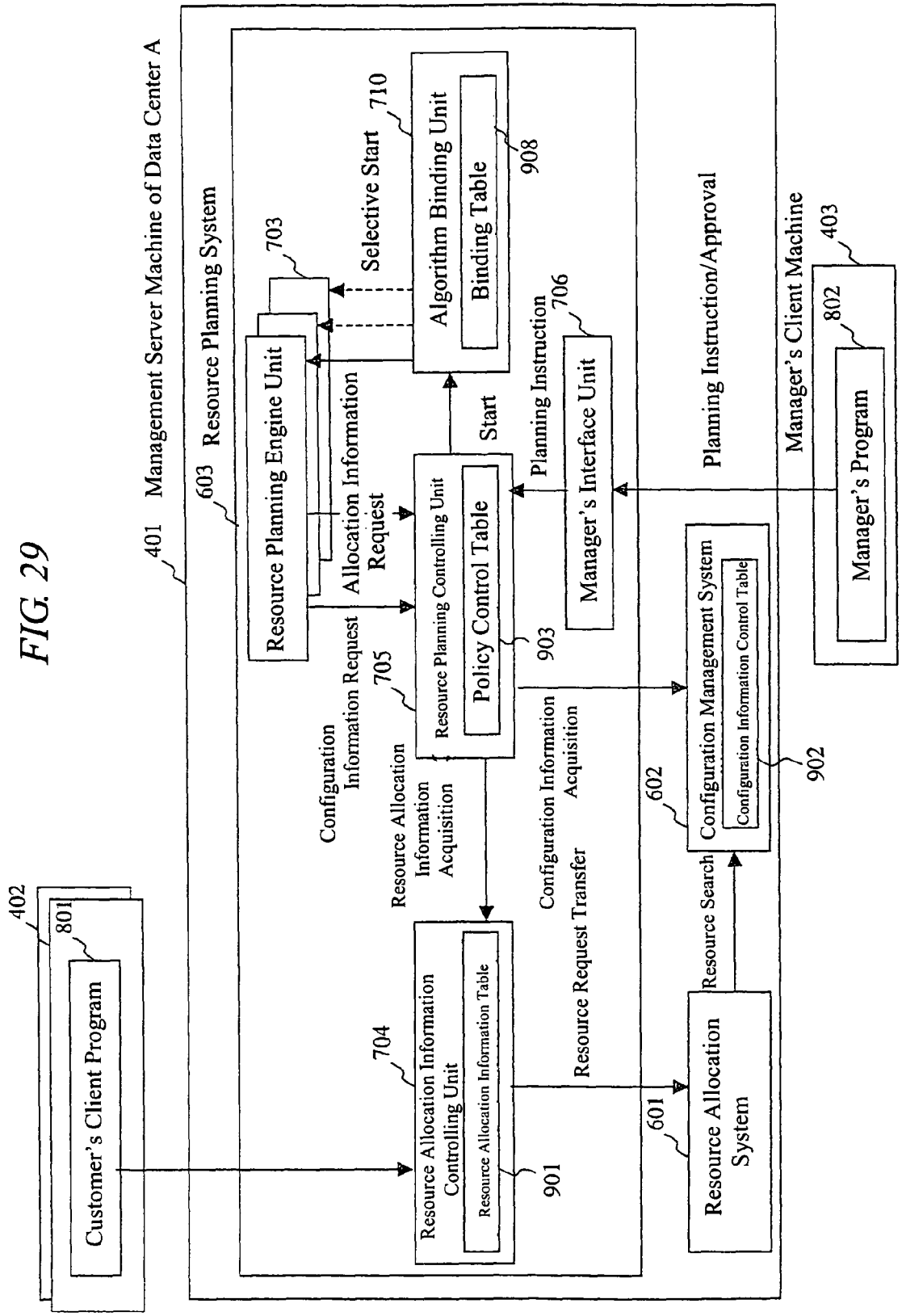
FIG. 29 shows a fifth embodiment and is a diagram showing a program configuration of a management server.

FIG. 29 shows a fifth embodiment, and there will be below described an operation of the resource planning system for planning the resource that the data center A should provide next, on the basis of the resource allocation request from the client, which provides a plurality of computer resources to the client and is assumed by a certain data center A and is selected from a plurality of resource planning algorithms by the policies of the system manager so as to be adapted thereto and is accumulated in advance.

The configuration of networks, server computers and the likes to be premised in the present embodiment is the same as that in the first embodiment (FIG. 1).

Next, a program configuration of the entire system will be explained. FIG. 29 shows a program configuration of the present embodiment, wherein, in comparison with the program configuration diagram in the first embodiment (FIG. 2), an algorithm binding unit 710 and a plurality of resource planning engine units 703 are added in the resource planning system 603, so that an arbitrary resource planning algorithm may be selected according to the policies of the system manager.

Figure 32:
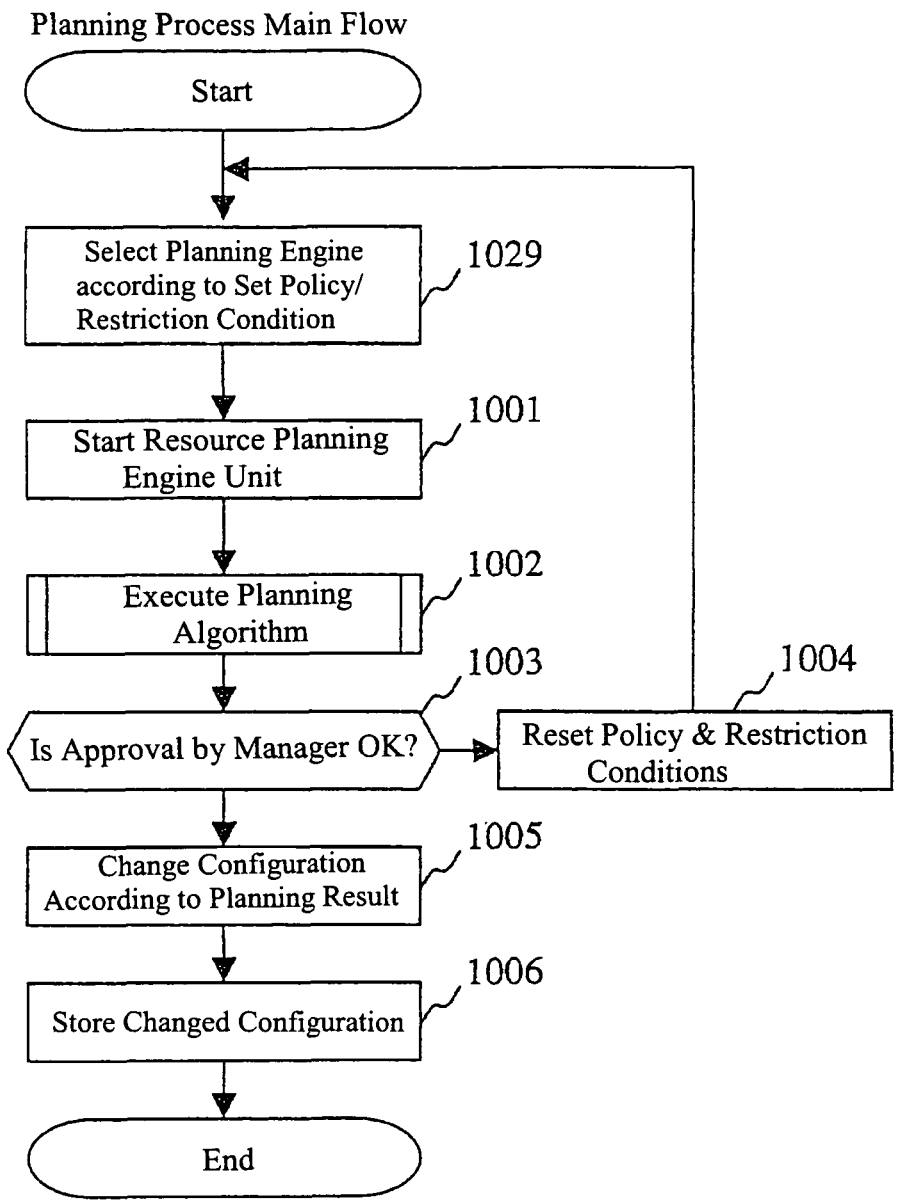
FIG. 32 is a flow chart showing a main routine of a planning process.

FIG. 32 shows a main flow chart of a resource planning process in the present embodiment, wherein, in comparison with the main flow chart of the first embodiment in FIG. 6, a step 1029 of selecting the resource planning engine unit corresponding to the policies from the plurality of resource planning engine units 703 is added thereto. Hereinafter, there will described an operation of the resource planning system in the case where the policy information in FIG. 30 is set.

Figure 30:
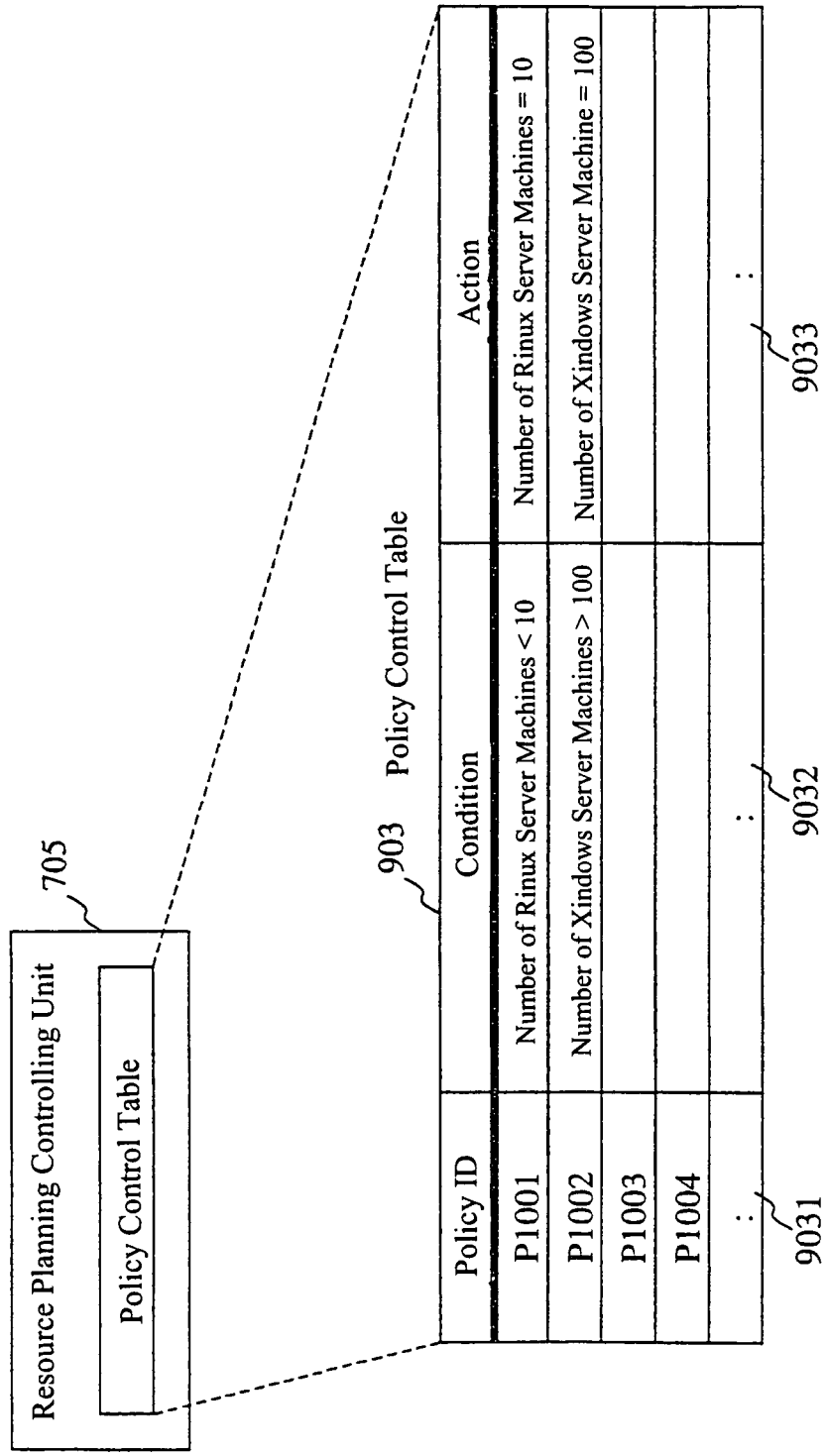
FIG. 30 is an explanatory view for showing an example of a policy control table.

First, the resource planning controlling unit 705 pay attention to the first line of the contents of a policy control table 903 shown in FIG. 30, and it is found that the above-mentioned policy information is the policy classification that the above-mentioned operating system designates. Therefore, the resource planning controlling unit requests the above policy classifying information and the starting of the resource planning engine unit 703, to the algorithm binding unit 710.

Figure 31:
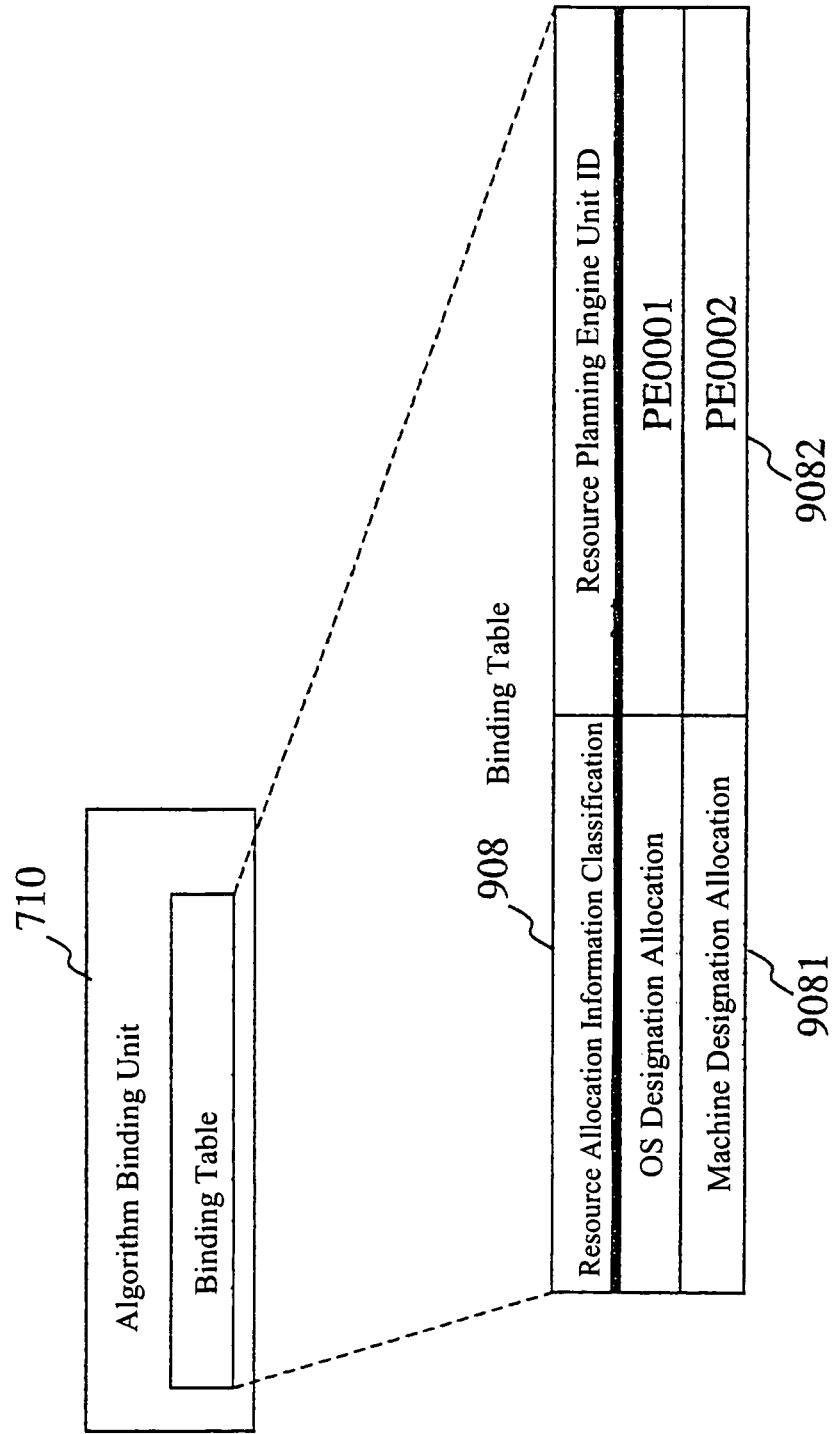
FIG. 31 is an explanatory view for showing an example of a binding table.

The Algorithm binding unit 710 searches for a preset binding table 908 in FIG. 31 on the basis of the designated policy classification, and acquires a resource planning engine unit ID, and starts the resource planning engine unit that corresponds to the ID. The started resource planning engine unit 703 executes a planning algorithm in the same manner as that in the first embodiment. Then, the resource planning engine unit 705 carries out the same process to other policy information items. Note that the binding table 908 comprises a resource allocation information classification 9081 and a resource planning engine unit ID 9082.

Since the resource planning engine units 703 to be started depending on the policy classification of the policy control table 903 may be automatically changed, it is possible to select/change the resource planning engines according to the kinds of resource allocation requests. Therefore, it is possible to easily cope with any resource allocation requests.

Sixth Embodiment

Figure 33:
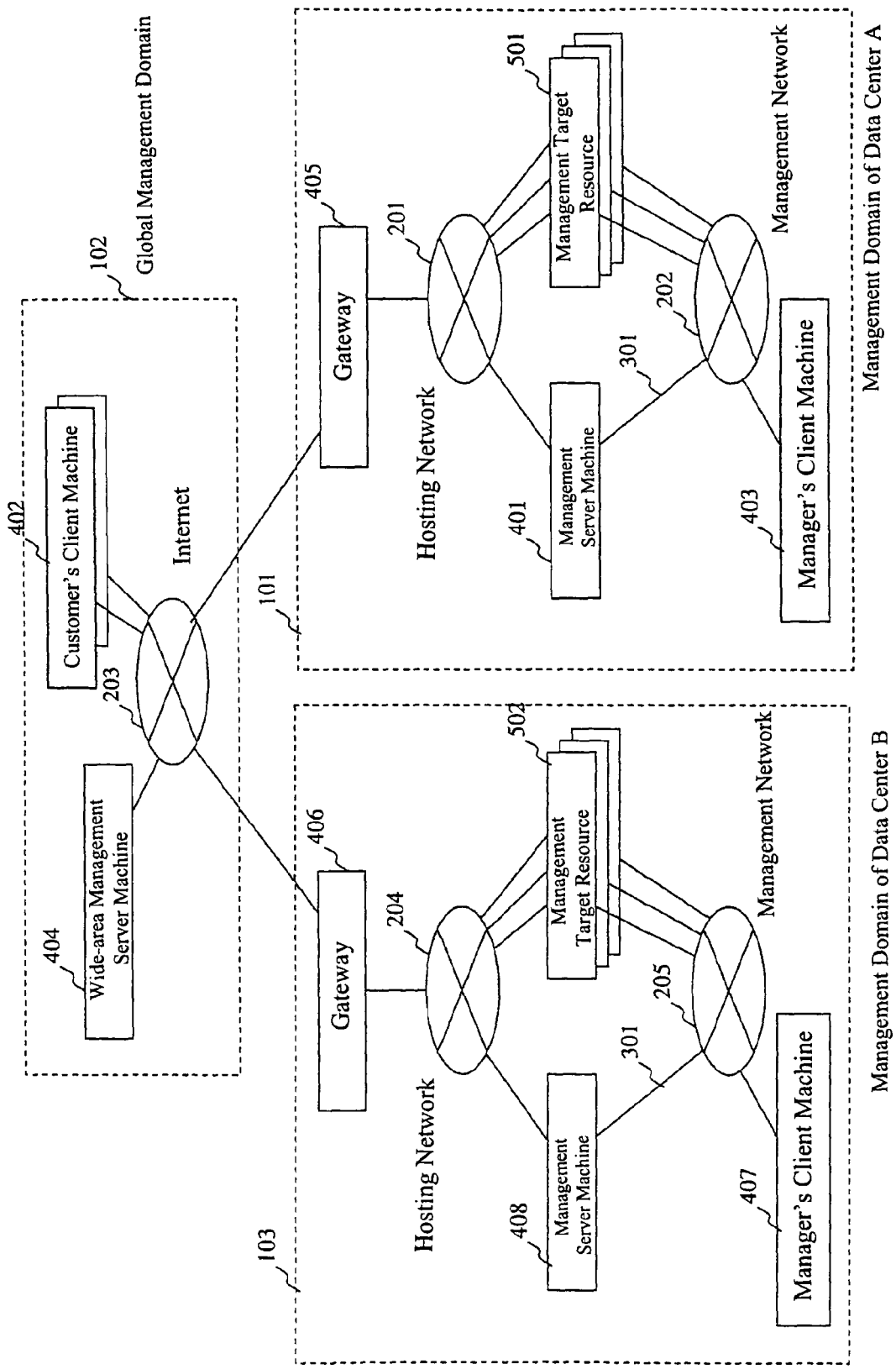
FIG. 33 shows a sixth embodiment and is a diagram showing the entire structure of a system.

FIG. 33 shows a sixth embodiment, and there will be below described an operation of the resource planning system for planning the resource that the data center A should provide next, on the basis of the resource allocation request from the client, which provides a plurality of computer resources to the client and is assumed by the data center A and the data center B and is accumulated in advance and the basis of the configurations of provision resources in the data center A and the data center B.

Note that, in the present embodiment, the data center A and the data center B are located in different management domains (sites) but are assumed to be in a cooperative relation.

First, the configuration of networks, server computers and the likes to be premised will be explained. FIG. 33 shows the entire system including the data center A and the data center B in the present embodiment. The configuration of the data center A is the same as that in the second embodiment. The data center B possesses a plurality of management target resources 502 and are connected to the manager's network 205 together with a management server machine 408 and a manager's client machine 407. Further, the management server machine and the management target resources are connected also to the hosting network 204 so as for the client or the end users of services that the client provides to be available thereto. The management domain 103 of the data center B shows the range in which the system manager of the data center B has authority to carry out the operations.

The customer's client machines 402 and the wide-area management server machine 404 are connected to Internet 203, and the Internet 203 and the hosting network 204 of the data center B are connected to each other by the gateway 406.

Figure 34:
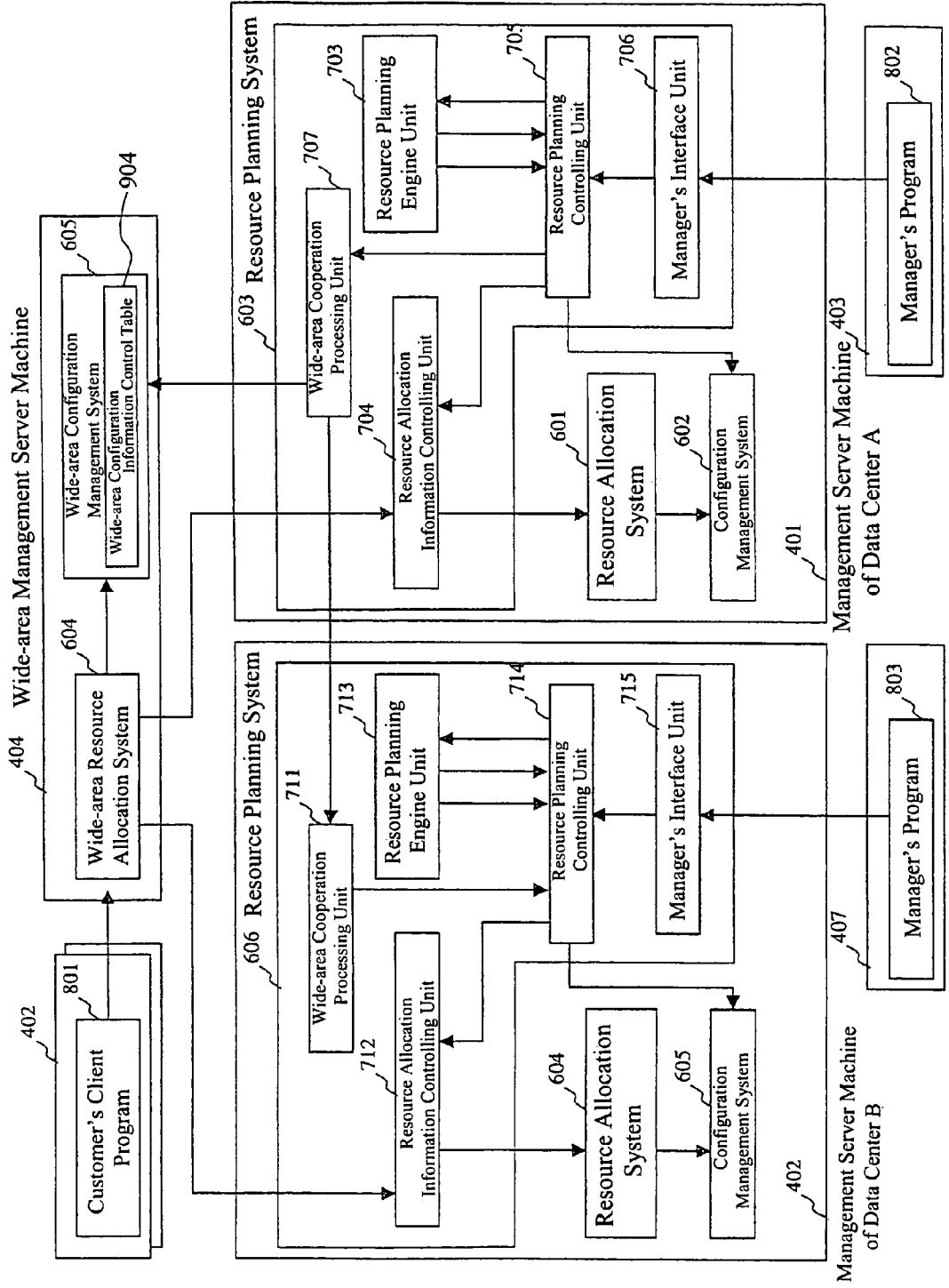
FIG. 34 is a block diagram of a program installed in a management server.

Next, the program configuration of the entire system will be explained. FIG. 34 shows a program configuration according to the present embodiment, and the configuration in the data center A is the same as that in the second embodiment.

The resource allocation system 604, the configuration controlling system 605, and the resource planning system 606 operate on the management server machine 402 of the data center B.

The resource planning system 606 includes a resource planning engine unit 713, a resource allocation information controlling unit 712, a resource planning controlling unit 714, a manager's interface unit 715, and a wide-area cooperation processing unit 711.

In the same manner as that in the second embodiment, the wide-area resource allocation system 604, and the wide-area configuration management system 605 operate on the wide-area management server machine 404. The wide-area configuration management system 605 includes wide-area configuration information control tables 904A and 904B of the data centers A and B (FIGS. 35 and 36), and the contents thereof include resource configuration information that respective local management domains including the data center A and the data center B provide.

On the premise of the above environment, the flow of the resource planning process will be explained hereinafter. In the present embodiment, the main flow of the resource planning process is the same as that of the second embodiment shown in FIG. 14.

Figure 37:
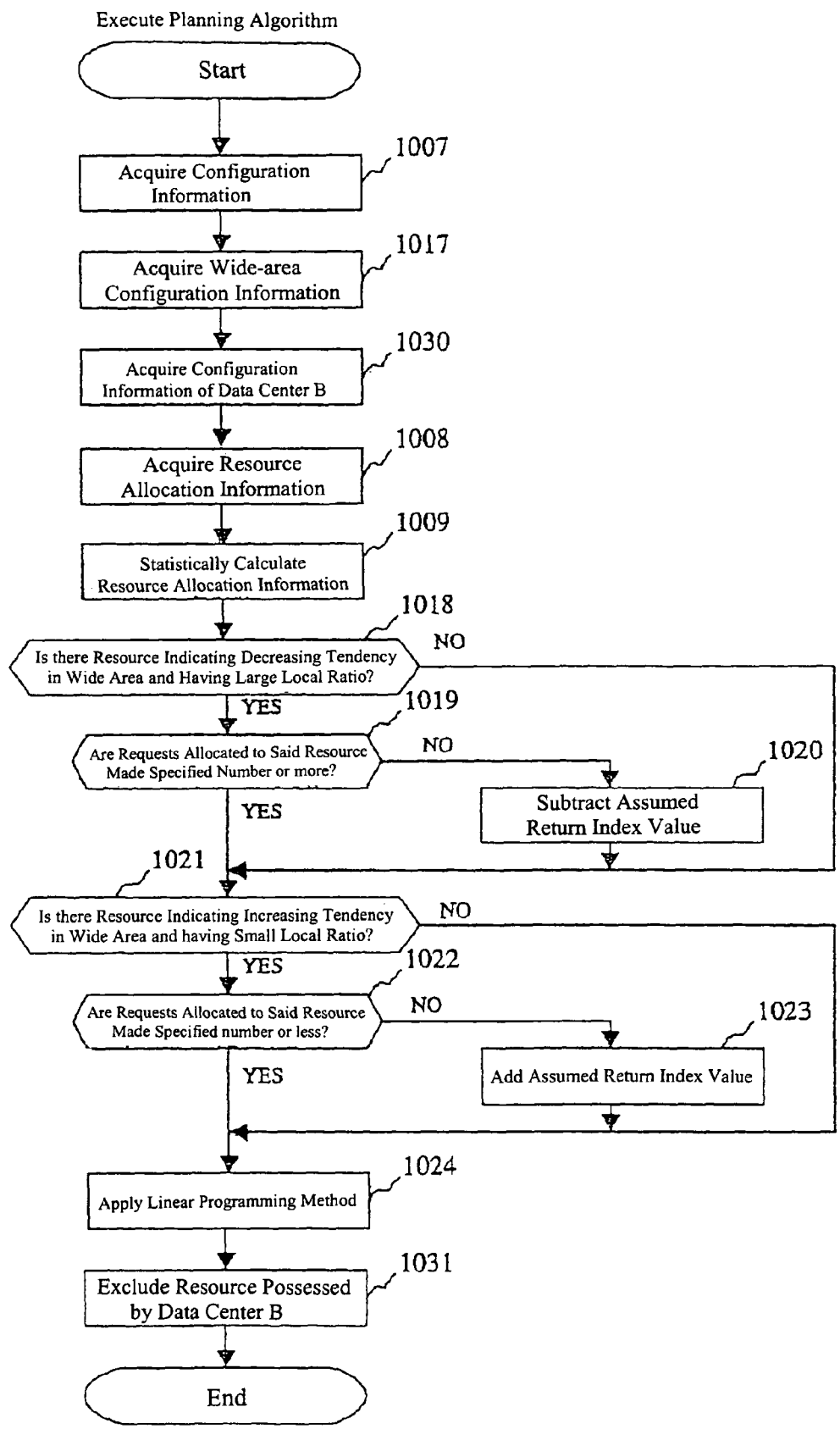
FIG. 37 is a flow chart showing an example of a planning algorithm executed in a resource planning engine unit.

FIG. 37 shows a flow chart of the planning algorithm that is processed in the resource planning engine unit 703 of the data center A according to the present embodiment.

First, in steps 1007 and 1017, resource configuration information in the data center A and the wide area is acquired. This process is the same as that in the second embodiment. Next, the resource planning engine unit 703 requests the resource planning controlling unit 705 to acquire the resource configuration information of the data center B that is in the cooperative relation.

The resource planning controlling unit 705 transfers a resource configuration information acquisition request to a wide-area cooperation processing unit 707, and the wide-area cooperation controlling unit 707 requests a wide-area cooperation processing unit 711 of the data center B to acquire resource configuration information. The wide-area cooperation processing unit 711 of the data center B gives the resource planning controlling unit 714 an instruction to acquire resource configuration information on the basis of the above-mentioned request, and the resource planning controlling unit 714 searches for the resource configuration information from the configuration controlling system 605 and notifies the acquired resource configuration information. The resource configuration information is transferred in reverse order of the above procedure and is delivered to the resource planning engine unit 703 (step 1030).

Next, the resource planning engine unit 703 carries out steps 1008 to 1024 in the same manner as that in the second embodiment, thereby obtaining resource planning results. However, by comparing the acquired resource configuration information of the data center B and the configuration information that is planning results, the configuration information that the data center B possesses is excluded and the remaining configuration information is obtained as the final planning results (step 1031).

Figure 35:
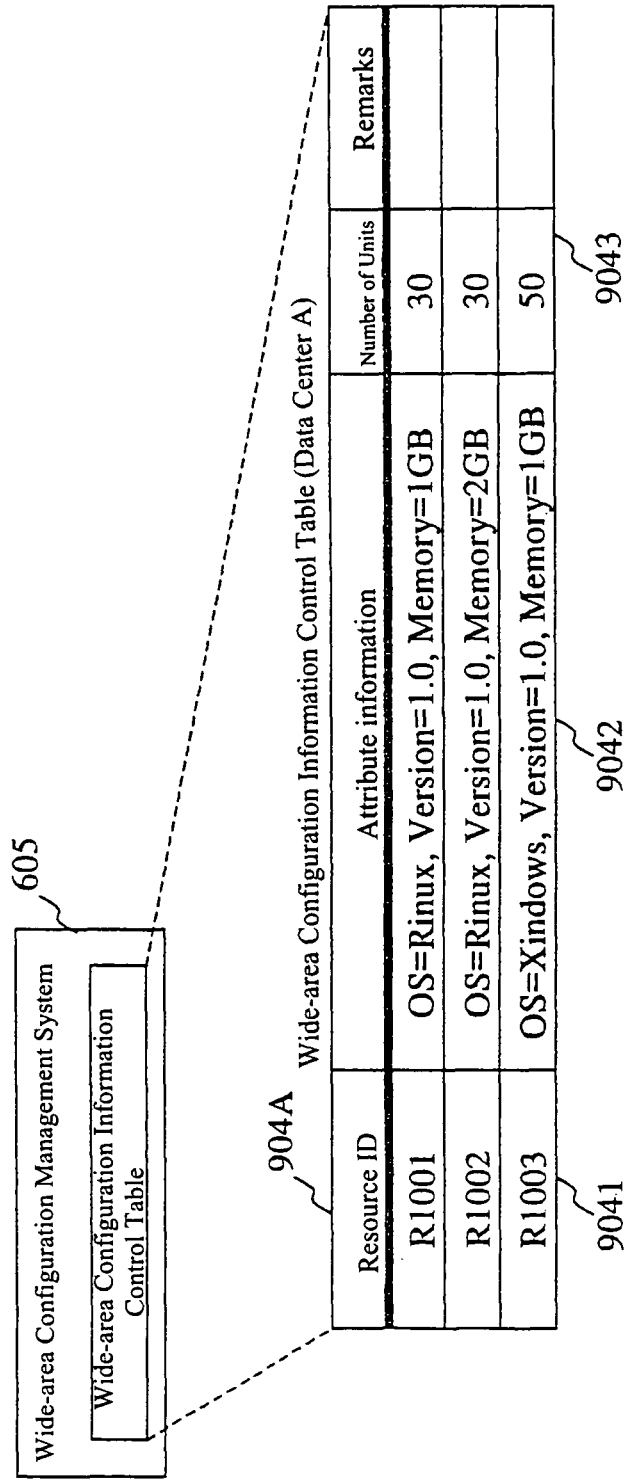
FIG. 35 is an explanatory view for showing an example of a configuration information control table of a data center A.
Figure 36:
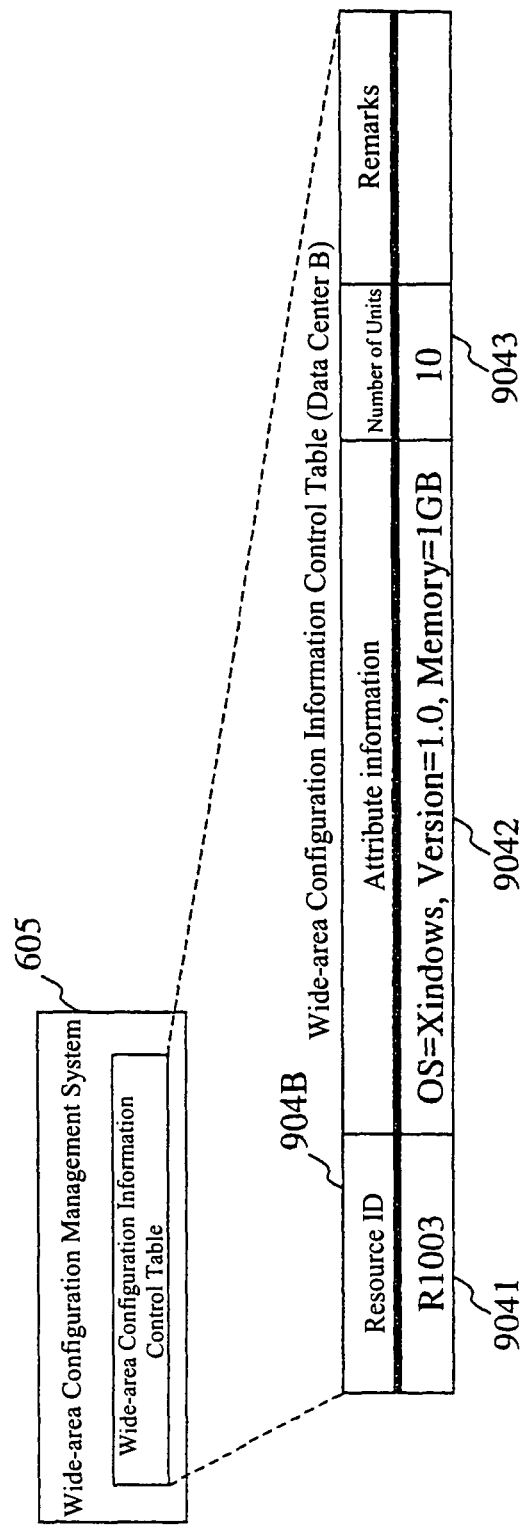
FIG. 36 is an explanatory view for showing an example of a configuration information control table of a data center B.
Figure 38:
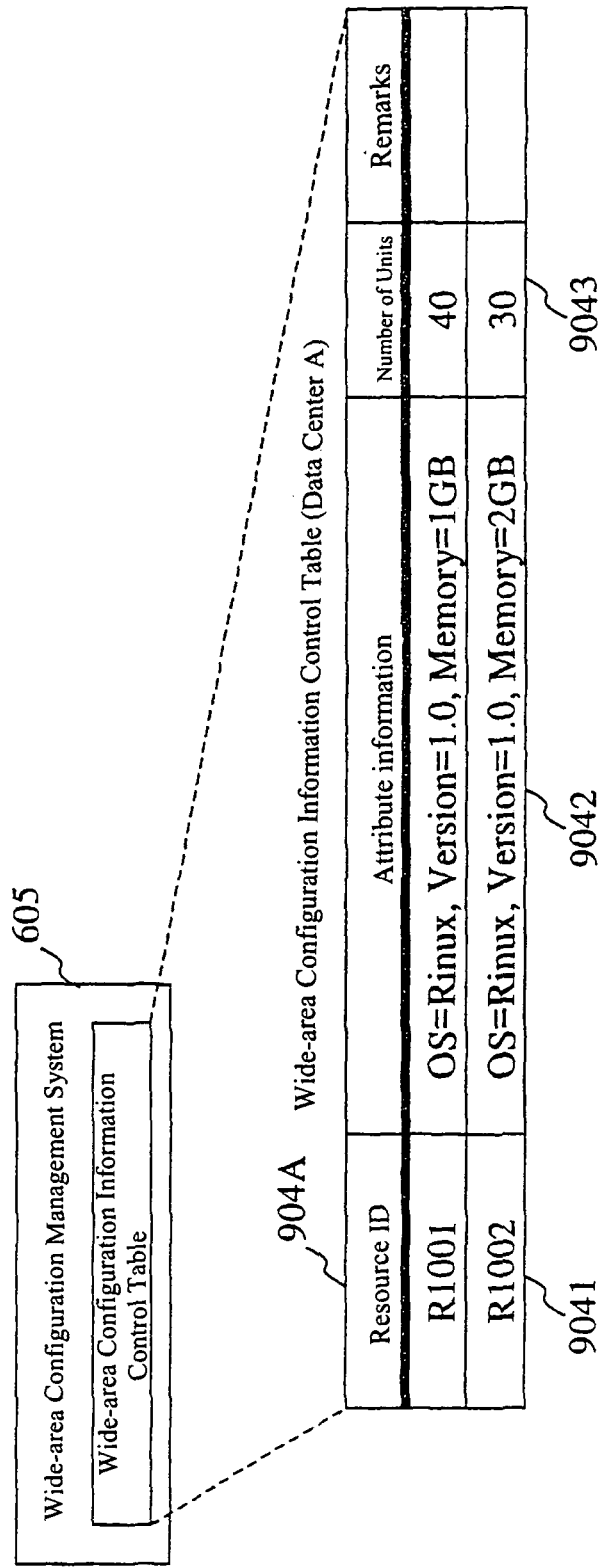
FIG. 38 is an explanatory view for showing a planning result and for showing an example of a configuration information control table of a data center A.
Figure 39:
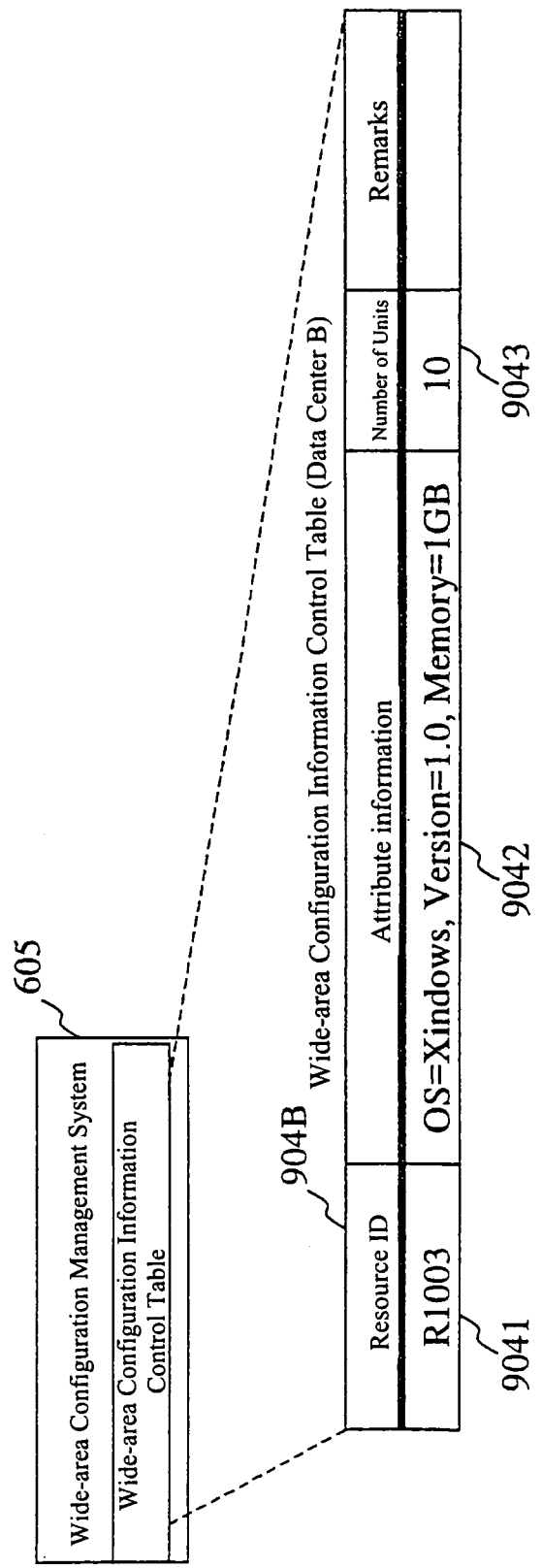
FIG. 39 is an explanatory view for showing a planning result and for showing an example of a configuration information control table of a data center B.

In the present embodiment, the resource configuration that the data centers A and B provide in their default status becomes shown in the wide-area configuration information control tables 904A and 904B of FIGS. 35 and 36, and the planning of the data center A is carried out under the same conditions as those in the second embodiment, and the resources included in the data center B are excluded in the step 1031, whereby the resource configuration information of the data center A, which is the planning results, becomes shown in the wide-area configuration information control tables 904A and 904B of FIGS. 38 and 39. By acquiring the configuration information of the data center B and making the acquired configuration information be reflected on the planning, it is possible to attain habitat segregation of the provision resources between the data centers in the cooperative relation and to effectively reduce the total costs between the cooperative data centers.

Note that, in the invention as claimed in claim 1, the above-mentioned restriction conditions or the policy information may be received from the manager's client and thereby these restriction conditions or the policy information may be set.

As describe above, according to the present invention, it is possible to automatically carry out the planning of the system resource configurations that correspond to various clients' needs and maximize the gains of the data centers, so that the present invention may be applied to the resource allocation systems in the data centers. Further, since the usability of the data centers can be automatically increased, the present invention may be applied to the IT systems in the company etc.

What is claimed is:

1. A system comprising:
 a plurality of server machines; and
 a management server configured to allocate, as allocatable resources which are allocatable to clients, the plurality of server machines executing programs; and
 wherein the management server is configured to:
 (A) receive a resource allocation request having request content including an allocation condition about a program installed in at least one of the plurality of server machines;
 (B) allocate an unallocated resource which satisfies the request content;
 (C) accumulate the request content to a request allocation history;
 (D) specify an allocation condition of resource which is concentratedly requested by the resource allocation requests, based on the request allocation history;
 (E) responsive to an increasing tendency of resource allocation requests in the system as shown by the request allocation history, increase a number of unallocated resources capable of satisfying the specified allocation condition in (D), by installing a program to a server machine
 (F) specify a condition of unallocated resource not used during a preset period; and
 (G) responsive to the unallocated resource being found to be not used during the preset period, decrease a number of unallocated resources satisfying the specified condition in (F) by un-installing a program in a certain server machine.

2. A system according to claim 1,
 wherein the request content includes an allocation condition about a server machine hardware.

3. A system according to claim 2,
 wherein the server machine hardware is a memory in a server machine.

4. A system according to claim 1,
 wherein the request allocation history further includes a result of the resource allocation request, and
 wherein the management server is configured to:
 (H) increase a number of unallocated resources satisfying a request content responsive to a rejected resource allocation request.

5. A management server configured to operate in a system including a plurality of server machines, the management server configured to allocate, as allocatable resources which are allocatable to clients, the plurality of server machines executing programs, wherein the management server is configured to:
 (A) receive a resource allocation request having request content including an allocation condition about a program installed in at least one of the plurality of server machines;
 (B) allocate an unallocated resource which satisfies the request content;
 (C) accumulate the request content to a request allocation history;
 (D) specify an allocation condition of resource which is concentratedly requested by the resource allocation requests, based on the request allocation history;
 (E) responsive to an increasing tendency of resource allocation requests in the system as shown by the request allocation history, increase a number of unallocated resources capable of satisfying the specified allocation condition in (D), by installing a program to a server machine;

(F) specify a condition of unallocated resource not used during a preset period; and (G) responsive to the unallocated resource being found to be not used during the preset period, decrease a number of unallocated resources satisfying the specified condition in (F) by un-installing a program in a certain server machine.

6. A management server according to claim 5, wherein the request content includes an allocation condition about a server machine hardware.

7. A management server according to claim 6, wherein the server machine hardware is a memory in a server machine.

8. A management server according to claim 5, wherein the request allocation history further includes a result of the resource allocation request, and
wherein the management server is further configured to:
(H) increase a number of unallocated resources satisfying a request content responsive to a rejected resource allocation request.

9. A non-transitory, computer-readable medium embodying a management program configured to operate in a system including a plurality of server machines, the management program configured to allocate, as allocatable resources which are allocatable to clients, the plurality of server machines executing programs, wherein the management program is configured to:

(A) receive a resource allocation request having request content including an allocation condition about a program installed in at least one of the plurality of server machines;

(B) allocate an unallocated resource which satisfies the request content;

(C) accumulate the request content to a request allocation history;

(D) specify an allocation condition of resource which is concentratedly requested by the resource allocation requests, based on the request allocation history;

(E) responsive to an increasing tendency of resource allocation requests in the system shown by the request allocation history, increase a number of unallocated resources capable of satisfying the specified allocation condition in (D), by installing a program to a server machine;

(F) specify a condition of unallocated resource not used during a preset period; and (G) responsive to the unallocated resource being found to be not used during the reset period, decrease a number of unallocated resources satisfying the specified condition in (F) by un-installing a program in a certain server machine.

10. A non-transitory, computer-readable medium according to claim 9, wherein the request content includes an allocation condition about a server machine hardware.

11. A non-transitory, computer-readable medium according to claim 10, wherein the server machine hardware is a memory in a server machine.

12. A non-transitory, computer-readable medium according to claim 9,
wherein the request allocation history further includes a result of the resource allocation request, and
wherein the management program is further configured to:
(H) increase a number of unallocated resources satisfying a request content responsive to a rejected resource allocation request.

* * * * *